(12) United States Patent
Choi et al.

(10) Patent No.: US 12,717,202 B2
(45) Date of Patent: Aug. 25, 2026

(54) LIGHT PATH CONTROL DEVICE AND DISPLAY DEVICE INCLUDING THE SAME

(71) Applicant: LG Display Co., Ltd., Seoul (KR)

(72) Inventors: Eunhee Choi, Paju-si (KR); Hyukjoon Yoon, Paju-si (KR); Daeyong Kim, Paju-si (KR); Heejong Shin, Paju-si (KR)

(73) Assignee: LG Display Co., Ltd., Seoul (KR)

(*) Notice: Subject to any disclaimer, the term of this patent is extended or adjusted under 35 U.S.C. 154(b) by 875 days.

(21) Appl. No.: 17/976,121

(22) Filed: Oct. 28, 2022

(65) Prior Publication Data

US 2023/0205038 A1 Jun. 29, 2023

(30) Foreign Application Priority Data

Dec. 27, 2021 (KR) ........................ 10-2021-0188116

(51) Int. Cl.

*G02F 1/1676* (2019.01)
*G02F 1/167* (2019.01)
*G02F 1/1675* (2019.01)

(52) U.S. Cl.

CPC ............ *G02F 1/1676* (2019.01); *G02F 1/167* (2013.01); *G02F 2001/1678* (2013.01); *G02F 2201/08* (2013.01)

(58) Field of Classification Search

CPC ............. G02F 1/134327; G02F 1/1334; G02F 1/1343; G02F 2201/12; G02F 1/23; G09F 9/35; G09F 13/20

See application file for complete search history.

(56) References Cited

U.S. PATENT DOCUMENTS

2011/0157537 A1* 6/2011 Chen ................. G02F 1/134336 349/158
2012/0026440 A1* 2/2012 Suwa ................ G02F 1/133711 445/24
2018/0088434 A1* 3/2018 Liang ...................... G02F 1/172

FOREIGN PATENT DOCUMENTS

| | | | | |
|---|---|---|---|---|
| CN | 101071214 | * | 11/2007 | ............. G02F 1/133 |
| JP | 2007-025188 | A | 2/2007 | |
| KR | 10-2039973 | B1 | 11/2019 | |
| KR | 10-2020-0012683 | A | 2/2020 | |
| KR | 10-2195645 | B1 | 12/2020 | |
| KR | 10-2021-0041859 | A | 4/2021 | |
| WO | WO 2008/012934 | A1 | 1/2008 | |

OTHER PUBLICATIONS

Korean Intellectual Property Office, Office Action, Korean Patent Application No. 10-2021-0188116, Dec. 18, 2024, 14 pages.
China National Intellectual Property Administration, Office Action, Chinese Patent Application No. 202211360987.9, Mar. 25, 2025, 17 pages.

* cited by examiner

*Primary Examiner* — Brandi N Thomas
(74) *Attorney, Agent, or Firm* — Fenwick & West LLP

(57) ABSTRACT

A display device includes a light path control device comprising a first substrate, a first electrode disposed above the first substrate, a second substrate disposed on the first substrate, a second electrode disposed below the second substrate, and a light conversion layer disposed between the first electrode and the second electrode and comprising a partition wall portion and a containing portion alternately disposed with each other.

7 Claims, 23 Drawing Sheets

LIGHT PATH CONTROL DEVICE AND DISPLAY DEVICE INCLUDING THE SAME

CROSS REFERENCE TO RELATED APPLICATION

The present application claims priority to Republic of Korea Patent Application No. 10-2021-0188116, filed Dec. 27, 2021, which is hereby incorporated by reference in its entirety.

BACKGROUND

Field

The present disclosure relates to a light path control device and a display device including the same.

Description of the Related Art

A light shielding film controls a light movement path according to an incident angle of external light, and therefore may function as a light path control device that blocks light from a specific direction and transmits light from another specific direction. Such a light shielding film is attached to a display device such as a mobile phone, a laptop computer, a tablet PC, a vehicle navigation device and the like, and therefore may adjust a wide viewing angle when an image is output or may implement a clear image quality within a specific viewing angle.

SUMMARY

Technical Problem

Recently, it has been developed a switchable light shielding film capable of turning on/off a viewing angle control mode according to a user environment. The switchable light shielding film blocks or opens a light path through dispersion and condensation of particles using electrical behavior particles dispersed in a solvent. However, although it is possible to implement a private mode and a share mode of the display device using such switchable light shielding film, there is a problem in that even in the share mode where the light path should be opened, light emission is limited by the electrical behavior particles and thus the luminance of light is reduced.

In addition, the switchable light shielding film has a flow rate and flow efficiency of the solvent and particles that may vary depending on an ambient temperature. For example, when the display device is used at a low temperature (e.g., a navigation device disposed in a vehicle in winter), the behavior of the particles may be lowered and thus its viewing angle may not be properly controlled.

The present disclosure provides a light path control device that ensures an aperture ratio using a patterned electrode, and a display device including the same.

In addition, the present disclosure provides a light path control device that includes a planar heating element to stabilize movement of the electrical behavior particles even at low temperatures, and a display device including the same.

Moreover, the present disclosure provides a light path control device that ensures luminance of light and improves an optical profile by patterning an electrode driving the planar heating element, and a display device including the same.

Technical Solution

A light path control device according to an embodiment may include a first substrate, a first electrode disposed above the first substrate, a second substrate disposed on the first substrate, a second electrode disposed below the second substrate, and a light conversion layer disposed between the first electrode and the second electrode and including a partition wall portion and a containing portion which are alternately disposed with each other, wherein the containing portion may include a conversion portion including a dispersing liquid and suspended particles dispersed in the dispersing liquid.

The first electrode may include at least one pattern portion patterned to overlap at least a portion of the containing portion.

The pattern portion may include a plurality of first pattern portions spaced apart from each other on the first substrate while extending in one direction and second pattern portions spaced apart from each other on the first substrate while extending in the one direction, wherein the first pattern portions and the second pattern portions may be disposed alternately with each other on the first substrate.

The second electrode may include a plurality of third pattern portions spaced apart from each other on the second substrate while extending in the one direction and respectively facing the first pattern portions, and a plurality of fourth pattern portions spaced apart from each other on the second substrate while extending in the one direction, and respectively facing the second pattern portions, wherein the third pattern portions and the fourth pattern portions may be disposed alternately with each other on the second substrate.

The first electrode may further include a first connecting portion connecting the first pattern portions and a second connecting portion connecting the second pattern portions, and the second electrode may further include a third connecting portion connecting the third pattern portions and a fourth connecting portion connecting the fourth pattern portions.

Voltages of different levels may be applied to the first pattern portions and the second pattern portions, and voltages of different levels may be applied to the third pattern portions and the fourth pattern portion.

Any one of a low potential voltage and a high potential voltage may be applied to the first pattern portions and the fourth pattern portions, and the other one of the low potential voltage and the high potential voltage may be applied to the second pattern portions and the third pattern portions.

The first electrode may be patterned to include a plurality of concentric circles, or a plurality of extension portions and a connecting portion connecting them.

The light conversion layer may be disposed adjacent to the first electrode or the second electrode, and may further include a light blocking layer having a lower refractive index than the dispersing liquid having the suspended particles dispersed therein.

The light path control device may further include an adhesive layer interposed between the first electrode and the light conversion layer and/or between the second electrode and the light conversion layer, and a heating layer configured to generate heat energy in response to an applied voltage.

The heating layer may be interposed between the first substrate and the first electrode, and may generate heat energy when a voltage is applied through the first electrode.

The light path control device may further include a heating electrode configured to apply a voltage to the heating layer.

The light path control device may further include an insulating layer disposed on the second electrode, a first-2 electrode disposed on the insulating layer, a second-2 electrode disposed on the first-2 electrode, and a second light conversion layer disposed between the first-2 electrode and the second-2 electrode.

A display device according to an embodiment may include a display panel in which pixels are disposed and configured to display an image, a gate driver configured to apply a gate signal to the pixels, a data driver configured to apply a data signal to the pixels in synchronization with the gate signal; a controller configured to display the image on the display panel by controlling the gate driver and the data driver; and a light path control device configured to control a path of light emitted from the display panel according to an operation mode.

The light path control device may include a first substrate, a first electrode disposed in an upper portion of the first substrate, a second substrate disposed on the first substrate, a second electrode disposed in a lower portion of the second substrate, and a light conversion layer disposed between the first electrode and the second electrode and including a partition wall portion and a containing portion alternately disposed with each other.

The containing portion may include a conversion portion including a dispersing liquid and suspended particles dispersed in the dispersing liquid, and the first electrode may include at least one pattern portion patterned to overlap at least a portion of the containing portion.

The pattern portion may include a plurality of first pattern portions spaced apart from each other on the first substrate while extending in one direction and second pattern portions spaced apart from each other on the first substrate while extending in the one direction, wherein the first pattern portions and the second pattern portions may be disposed alternately with each other on the first substrate.

The second electrode may include a plurality of third pattern portions spaced apart from each other on the second substrate while extending in the one direction and respectively facing the first pattern portions, and a plurality of fourth pattern portions spaced apart from each other on the second substrate while extending in the one direction and respectively facing the second pattern portions, wherein the third pattern portions and the fourth pattern portions may be disposed alternately with each other on the second substrate.

Voltages of different levels may be applied to the first pattern portions and the second pattern portions, and voltages of different levels may be applied to the third pattern portions and the fourth pattern portion.

The light conversion layer may be disposed adjacent to the first electrode or the second electrode, and may further include a light blocking layer having a lower refractive index than the dispersing liquid having the suspended particles dispersed therein.

The light path control device may include a temperature sensor configured to sense an external temperature and a heating layer configured to generate heat energy when a voltage is applied from at least one of the first electrode and the second electrode based on the sensed temperature.

The controller may be configured to, when the sensed temperature is lower than a preset threshold, control at least one of the first electrode and the second electrode such that the voltage is applied to the heating layer.

The light path control device may be configured, in the private mode, to operate in a light-blocking mode in which the suspended particles are uniformly dispersed in the dispersing liquid, and in the share mode, to operate in a light-transmitting mode in which the suspended particles are agglomerated in at least one of the first electrode or the second electrode.

DETAILED DESCRIPTION

Figure 1:
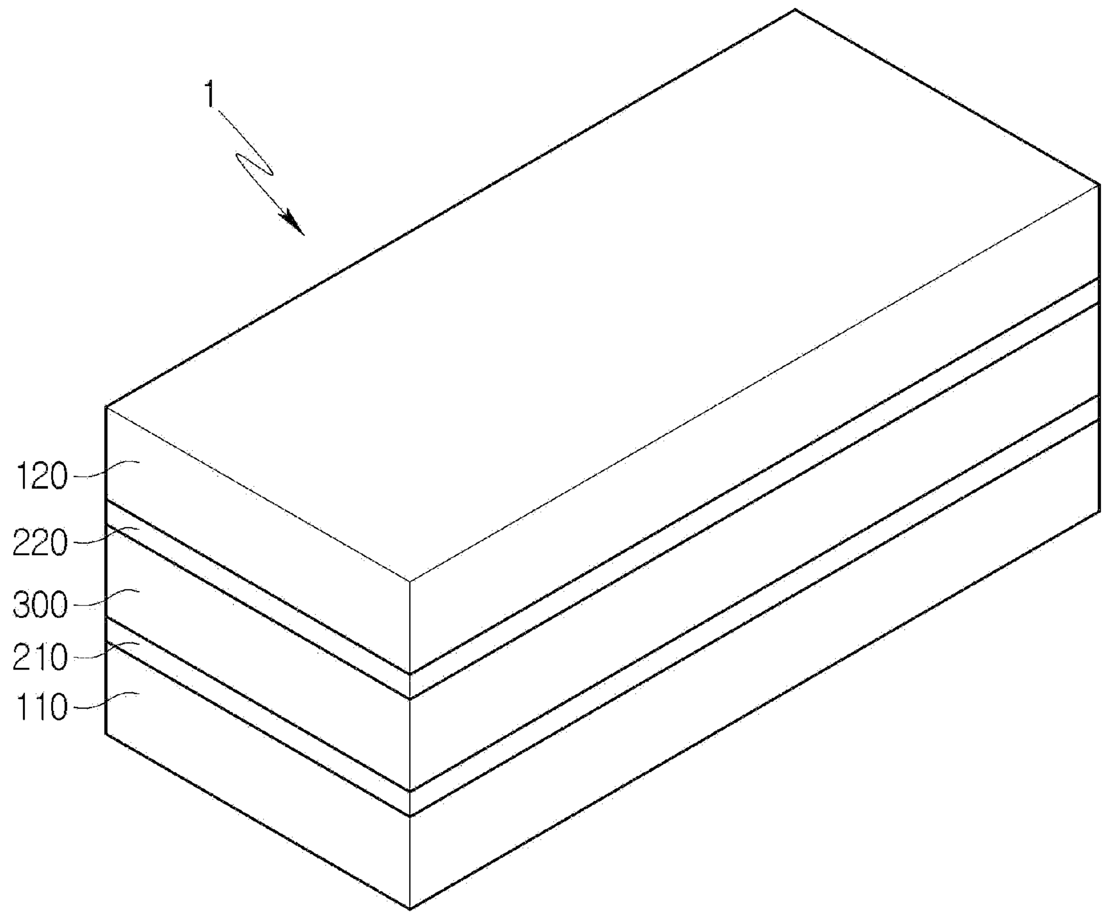
FIG. 1 is a perspective view of a light path control device according to a first embodiment.

Hereinafter, embodiments will be described with reference to the drawings. When an element (or area, layer, portion, etc.) is referred to as being "on," "connected to," or "coupled to" another element, it may be directly on, connected to, or coupled to the other element or layer or intervening elements may be present therebetween.

Like reference numerals denote like elements. In the drawings, the thickness, ratio, and size of each element are exaggerated for clarity and descriptive purposes. As used herein, the term "and/or" includes any and all combinations of one or more of the associated listed items.

Although the terms "first", "second" and the like are used for describing various elements, these elements are not confined by these terms. These terms are merely used for distinguishing one element from another element. Therefore, a first element to be mentioned below may be referred to as a second element without departing from the scope of the present disclosure, and similarly a second element may be referred to as a first element. The singular forms, "a," "an," and "the" are intended to include the plural forms as well, unless the context clearly indicates otherwise.

Terms, such as "beneath", "below", "upper", "above", and the like, may be used herein to describe one element or feature's relationship to another element(s) or feature(s) as illustrated in the drawings. The terms are spatially relative terms, and are described based on the orientation depicted in the drawings.

The terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Figure 2:
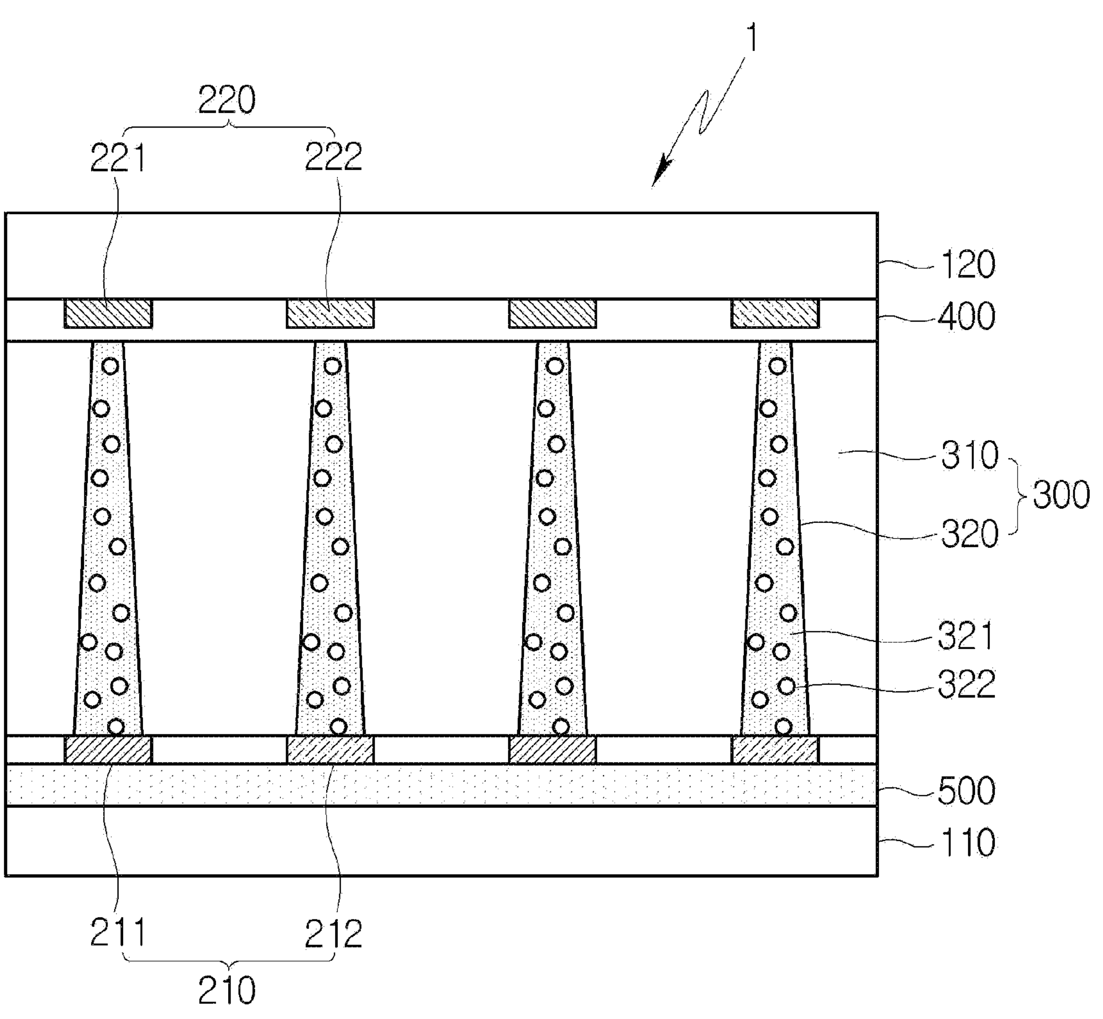
FIGS. 2 and 3 are cross-sectional views of the light path control device according to the first embodiment.
Figure 3:
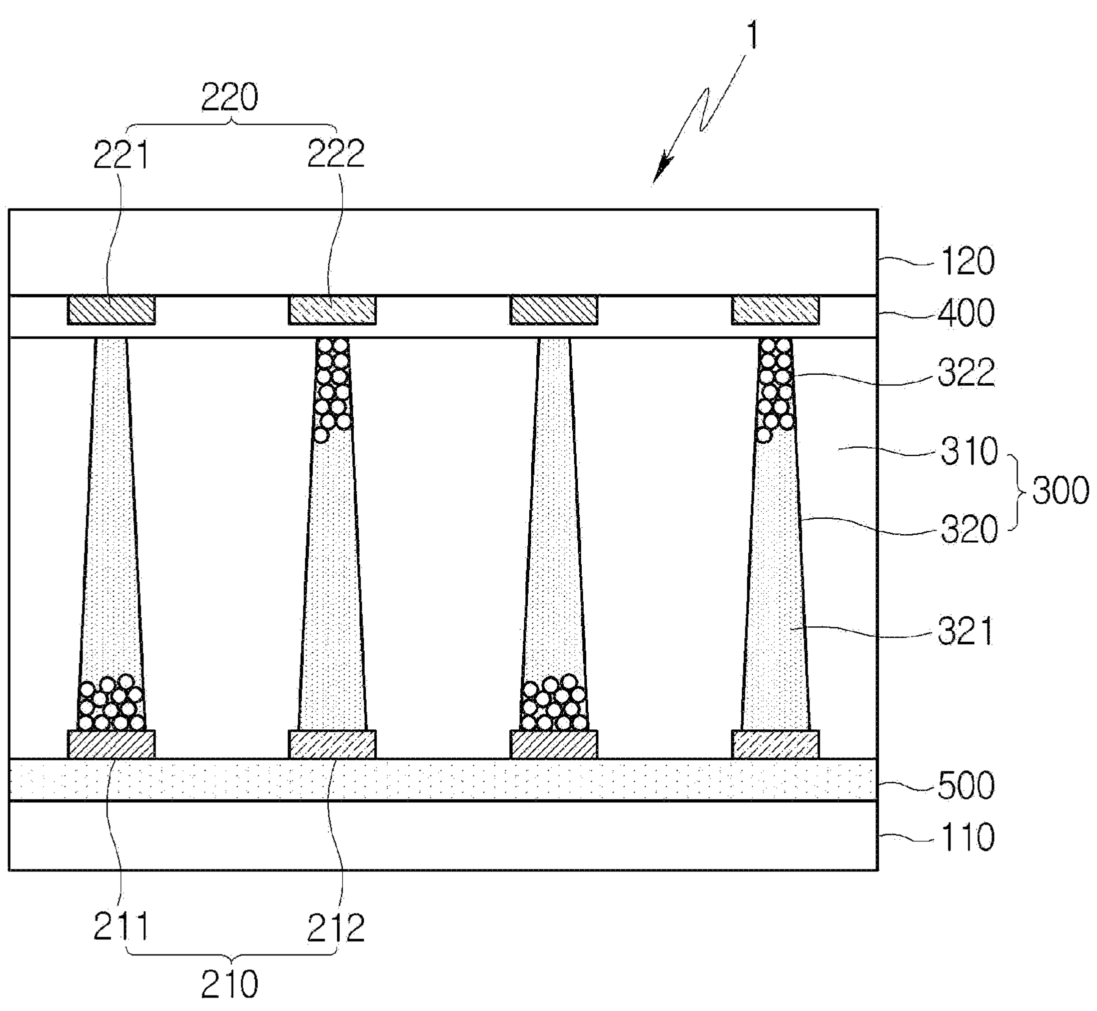
Figure 4:
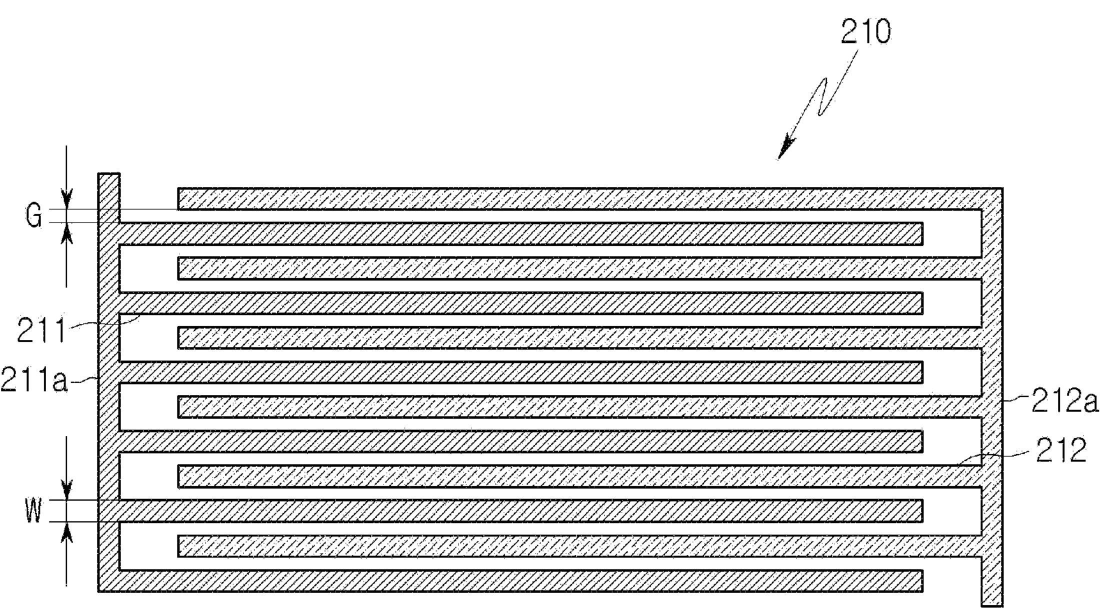
FIGS. 4 and 5 are plan views of electrodes according to the first embodiment.
Figure 5:
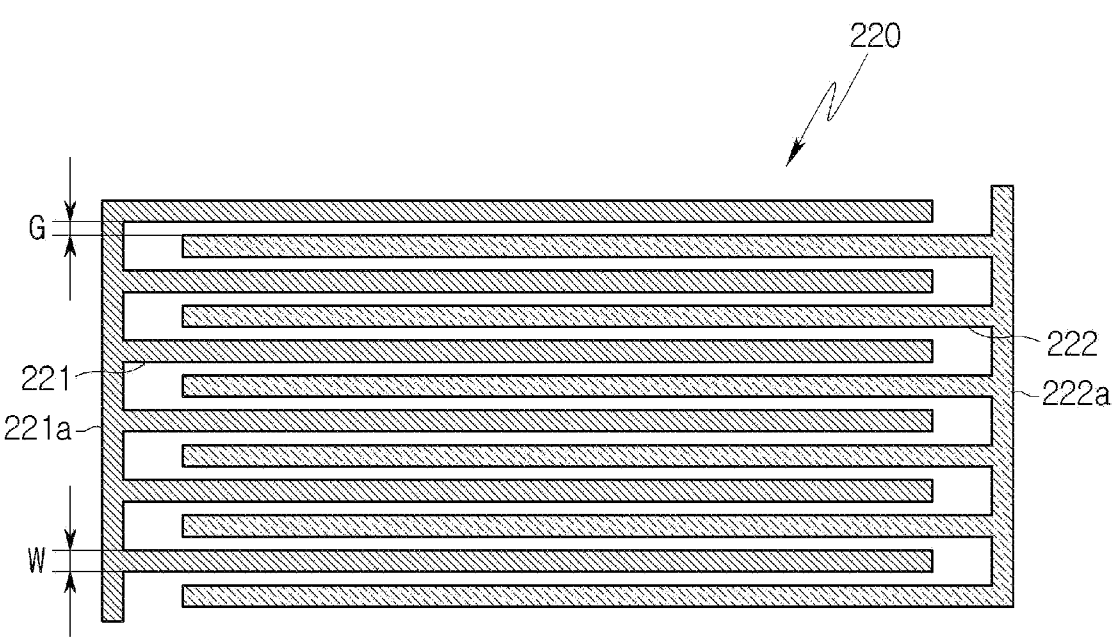
Figure 6:
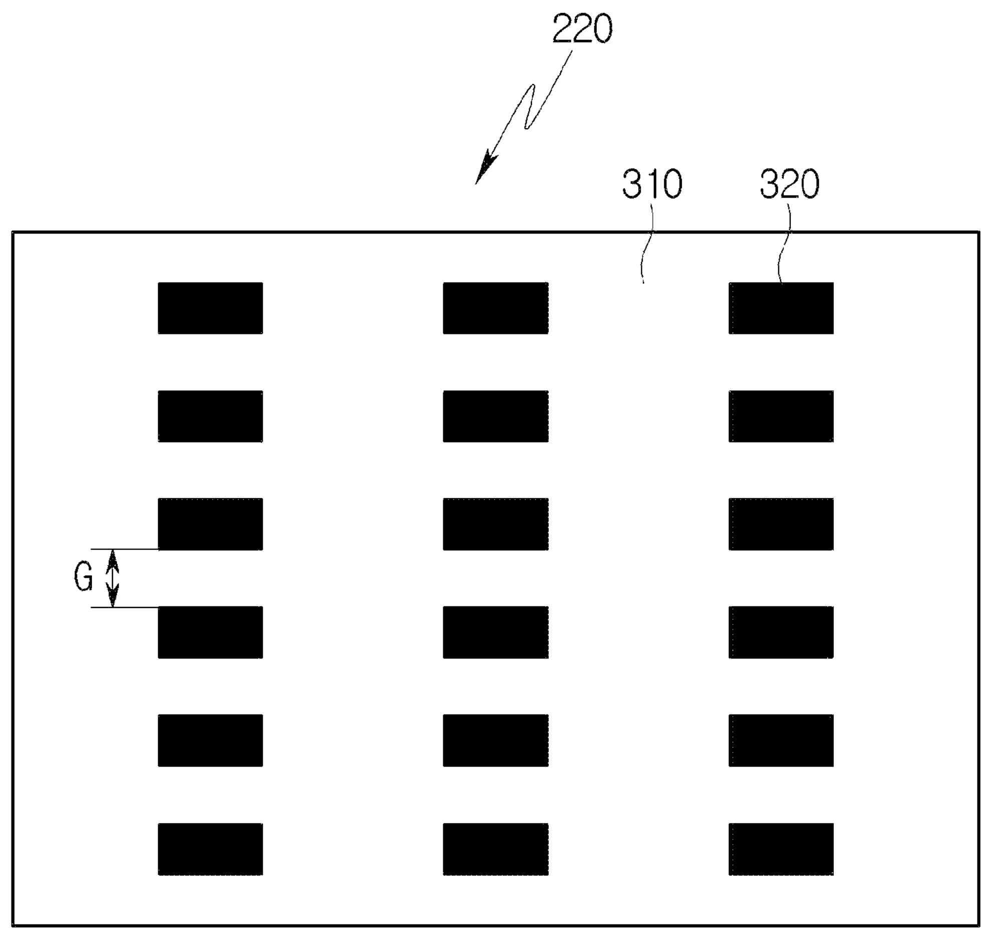
FIG. 6 is a plan view of a light conversion layer in a light-transmitting mode according to on embodiment.
Figure 7:
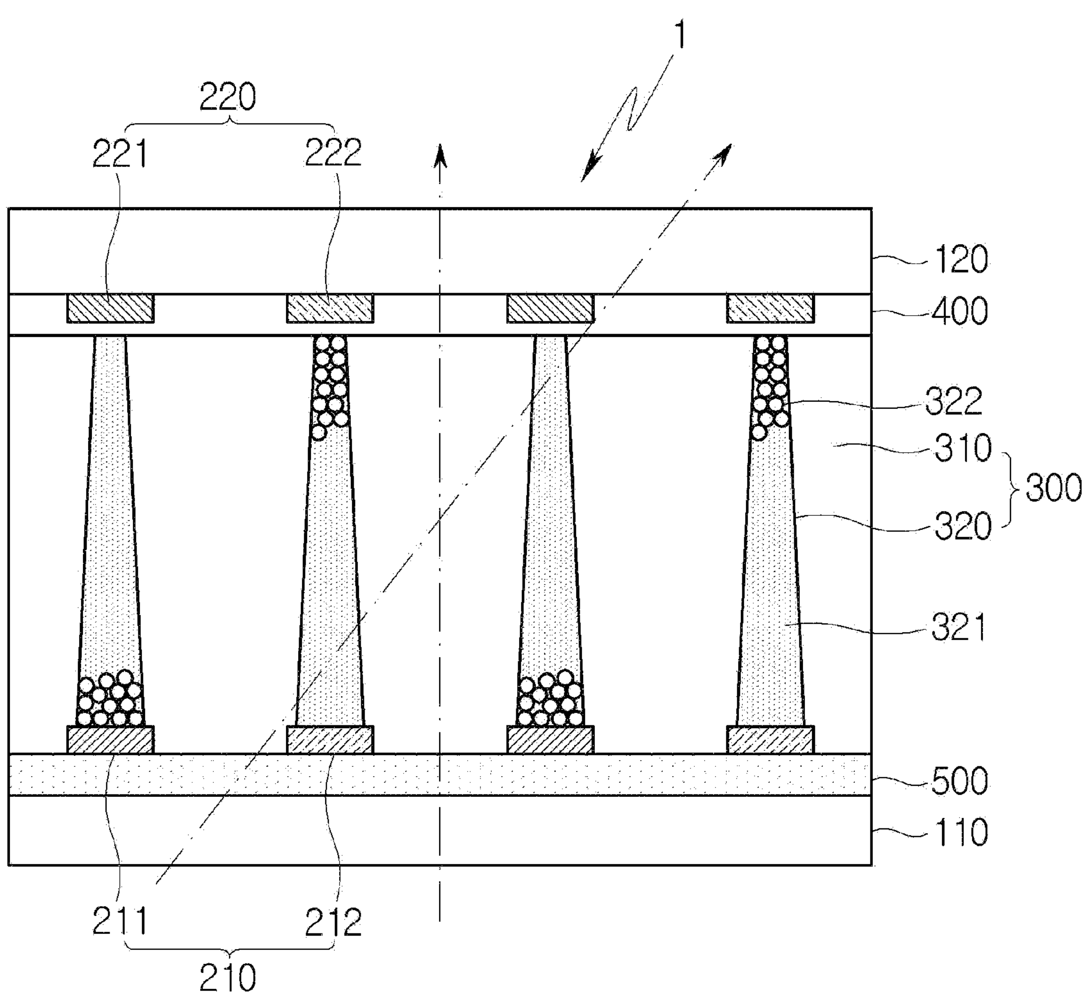
FIG. 7 is a view for explaining an increase in an aperture ratio of the light path control device according to the first embodiment.

FIG. 1 is a perspective view of a light path control device according to a first embodiment. FIGS. 2 and 3 are cross-sectional views of the light path control device according to the first embodiment. FIGS. 4 and 5 are plan views of electrodes according to the first embodiment. FIG. 6 is a plan view of a light conversion layer in a light-transmitting mode according to one embodiment. FIG. 7 is a view for explaining an increase in an aperture ratio of the light path control device according to the first embodiment.

Referring to FIGS. 1 to 3, a light path control device 1 may include a first substrate 110, a second substrate 120, and a first electrode 210, a second electrode 220, and a light conversion layer 300.

The first substrate 110 is a base substrate of the light path control device 1, and may be a light-transmissive substrate. The first substrate 110 may be a rigid substrate including glass or reinforced glass or a flexible substrate of a plastic material. For example, the first substrate 110 may be a flexible polymer film and may include any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), a triacetylcellulose (TAC) film, a polyvinyl alcohol (PVA) film, polyimide (PI), and polystyrene (PS). However, the material of the first substrate 110 is not limited thereto.

The first electrode 210 may be disposed on one surface (e.g., an upper surface) of the first substrate 110. The first electrode 210 is interposed between the first substrate 110 and the second substrate 120 to be described below. For example, the first electrode 210 may be disposed on the upper surface of the first substrate 110 in the form of a surface electrode. However, the present embodiment is not limited thereto, and, in another embodiment, the first electrode 210 may be disposed on the first substrate 110 in the form of a pattern electrode having a predetermined pattern.

Referring to FIG. 4, the first electrode 210 may include first pattern portions 211 and second pattern portions 212. The first pattern portions 211 are formed to be spaced apart from each other on the first substrate 110 and extend in one direction. The first pattern portions 211 may be connected to each other through a connecting portion 211*a*. The second pattern portions 212 are formed to be spaced apart from each other on the first substrate 110 and extend in one direction. The second pattern portions 212 may extend substantially parallel to the first pattern portions 211. The second pattern portions 212 may be connected to each other through the connecting portion 212*a*.

The first pattern portions 211 and the second pattern portions 212 are alternately disposed with each other on the first substrate 110 along a direction perpendicular to the one direction. That is, the second pattern portion 212 may disposed between the adjacent first pattern portions 211, and the first pattern portion 211 may be disposed between the adjacent second pattern portions 212.

The first pattern portion 211 and the second pattern portion 212 may have the same or different widths W. A gap G between the adjacently disposed first pattern portion 211 and second pattern portion 212 may ensure an aperture ratio of the light path control device 1 and may be appropriately selected to implement a light-transmitting mode and a light-blocking mode, which will be described below.

The first electrode 210 may be include a transparent conductive material. For example, the first electrode 210 may be formed of indium tin oxide (ITO), indium zinc oxide (IZO), copper oxide, tin oxide, zinc oxide (ZnO), titanium oxide or the like. In an embodiment, a light transmittance of the first electrode 210 may be greater than or equal to about 80%. Then, the first electrode 210 is not visibly recognized from the outside and the light transmittance thereof is increased, such that a luminance of the display device including the light path control device 1 may be improved.

In another embodiment, the first electrode 210 may include various metals for low resistance. For example, the first electrode 210 may include at least one metal of chromium (Cr), nickel (Ni), copper (Cu), aluminum (Al), silver (Ag), molybdenum (Mo), gold (Au), titanium (Ti), and an alloy thereof.

The second substrate 120 may be disposed on the first substrate 110. The second substrate 120 is a light-transmitting substrate, and may include the same or similar material with the first substrate 110.

The second electrode 220 may be disposed on one surface (e.g., a lower surface) of the second substrate 120. The second electrode 220 is interposed between the first substrate 110 and the second substrate 120. For example, the second electrode 220 may be disposed on the lower surface of the second substrate 120 in the form of a surface electrode. However, the present embodiment is not limited thereto, and, in another embodiment, the second electrode 220 may be disposed on the second substrate 120 in the form of a pattern electrode having a predetermined pattern.

Referring to FIG. 5, the second electrode 220 may include first pattern portions 221 and second pattern portions 222. The first pattern portions 221 are formed to be spaced apart from each other on the second substrate 120 and extend in one direction. The first pattern portions 221 may be connected to each other through the connecting portion 221*a*. The second pattern portions 222 are formed to be spaced apart from each other on the second substrate 120 and extend in one direction. The second pattern portions 222 may extend substantially parallel to the first pattern portions 221. The second pattern portions 222 may be connected to each other through a connecting portion 222*a*.

The first pattern portions 221 and the second pattern portions 222 are alternately disposed with each other on the second substrate 120. That is, the second pattern portion 222 may disposed between the adjacent first pattern portions 221, and the first pattern portion 221 may be disposed between the adjacent second pattern portions 222.

The first pattern portion 221 and the second pattern portion 222 may have the same or different widths W. A gap G between the adjacently disposed first pattern portion 221 and second pattern portion 222 may ensure the aperture ratio of the light path control device 1 and may be appropriately selected to implement the light-transmitting mode and the light-blocking mode.

The pattern portions 221 and 222 of the second electrode 220 are disposed to at least partially or entirely overlap or to be at least adjacent to the pattern portions 211 and 212 of the first electrode 210. Accordingly, when a voltage is applied to the first electrode 210 and the second electrode 220, an electric field is generated between the pattern portions 211, 212, 221 and 222. In an embodiment, the first pattern portion 211 of the first electrode 210 may be disposed to overlap the first pattern portion 221 of the second electrode 220, and the second pattern portion 212 of the first electrode 210 may be disposed to overlap the second pattern portion 222 of the second electrode 220.

The second electrode 220 may include a transparent conductive material, and may include various metals for low resistance. The second electrode 220 may include the same or similar material as the first electrode 210.

The light conversion layer 300 may be interposed between the first substrate 110 and the second substrate 120. The light conversion layer 300 may include a partition wall portion 310 and a containing portion 320. Specifically, the light conversion layer 300 may include a containing portion 320 partitioned into a plurality of areas by the partition wall portion 310.

In the light conversion layer 300, the partition wall portion 310 and the containing portion 320 may be alternately disposed with each other in one direction. In this case, the partition wall portion 310 and the containing portion 320 may have the same or different widths with respect to the one direction.

The partition wall portion 310 may include a transparent light-transmitting material. For example, the partition wall portion 310 may be formed of a UV resin or a photoresist resin as a photo-curable resin, or may be formed of a urethane resin, an acrylic resin, etc. Such partition wall portion 310 may transmit light incident to the first substrate 110 or the second substrate 120 in an opposite direction.

As illustrated, the containing portion 320 may have one end and the other end of which widths are the same as or different from each other. In the illustrated embodiment, the containing portion 320 is described in an example where the width of one end adjacent to the first substrate 110 is wider than the width of the other end adjacent to the second substrate 120.

The containing portion 320 is disposed such that at least one area thereof overlaps the pattern portions 211 and 212 of the first electrode 210. In addition, the containing portion 320 is disposed such that at least one area thereof overlaps the pattern portions 221 and 222 of the second electrode 220. That is, the first electrode 210 includes at least one pattern portions 211, 212 overlapping at least one area of the containing portion 320, and the second electrode 220 includes at least one pattern portions 221, 222 overlapping at least one area of the containing portion 320.

The containing portion 320 may include a dispersing liquid 321 and suspended particles 322 dispersed in the dispersing liquid 321. That is, the dispersing liquid 321 may be filled in the containing portion 320, and the suspended particles 322 may be dispersed in the dispersing liquid 321.

The dispersing liquid 321, which is a solvent in which the suspended particles 322 are dispersed, may be an insulating solvent that is transparent and has a low viscosity. For example, the dispersing liquid 321 may include at least one of halocarbon-based oil, paraffinic oil, and isopropyl alcohol.

The suspended particles 322 may be colored electrical behavior particles, for example, black particles. The suspended particles 322 may be, but are not limited to, carbon black particles. The containing portion 320 may be electrically connected to the first electrode 210 and the second electrode 220, and the charged suspended particles 322 may be controlled in terms of an arrangement state thereof according to a voltage difference between the first electrode 210 and the second electrode 220. According to an arrangement state of the suspended particles 322, the light conversion layer 300 may implement the light-transmitting mode and the light-blocking mode.

Specifically, when no voltage is applied to the first electrode 210 and the second electrode 220, the suspended particles 322 are uniformly dispersed in the dispersing liquid 321 as illustrated in FIG. 2, and thus implement a light-blocking mode that blocks the transmission of external light. Here, since the external light applied to the partition wall portion 310 may pass through the light conversion layer 300, the external light may be visibly recognized from the front of the light path control device 1. That is, the light path control device 1 may implement the private mode in which a view is opened for a specific viewing angle (e.g., a front viewing angle) and a view is blocked for another viewing angle (e.g., a side viewing angle).

When a voltage is applied to at least one of the first electrode 210 and the second electrode 220, the suspended particles 322 may move by an electric field toward a direction of the first electrode 210 or the second electrode 220, as illustrated in FIG. 3. Here, the moving direction of the suspended particles 322 may be controlled according to the polarity (negative or positive) of the suspended particles 322 and a relative magnitude of the voltage applied to the first electrode 210 and the second electrode 220.

When the suspended particles 322 are agglomerated around the first electrode 210 or the second electrode 220, external light passes through the partition wall portion 310 and the containing portion 320, through which the light-transmitting mode may be implemented. That is, the light path control device 1 may implement the share mode in which a view is opened for both the front and side.

In an embodiment, the first pattern portions 211 and the second pattern portions 212 of the first electrode 210 may receive voltages of different levels. For example, a high potential voltage (e.g., a positive voltage) is applied to the first pattern portions 211 of the first electrode 210, and a low potential voltage (e.g., a negative voltage) may be applied to the second pattern portions 212 thereof. Similarly, voltages of different levels may be applied to the first pattern portions 221 and the second pattern portions 222 of the second electrode 220. For example, a low potential voltage (e.g., a negative voltage) is applied to the first pattern portions 221 of the second electrode 220, and a high potential voltage (e.g., a positive voltage) may be applied to the second pattern portions 222 thereof.

In this embodiment, since the directions of the electric fields formed between the first pattern portions 211 and 221 and between the second pattern portions 212 and 222 are opposite to each other, movement directions of the suspended particles 322 between the first pattern portions 211 and 221 and between the second pattern portions 212 and 222 may be opposite to each other. For example, the suspended particles 322 between the first pattern portions 211 and 221 may be agglomerated around the first electrode 210, and the suspended particles 322 between the second pattern portions 212 and 222 may be agglomerated around the second electrode 220 (moving up and down in a zigzag manner).

Figure 8:
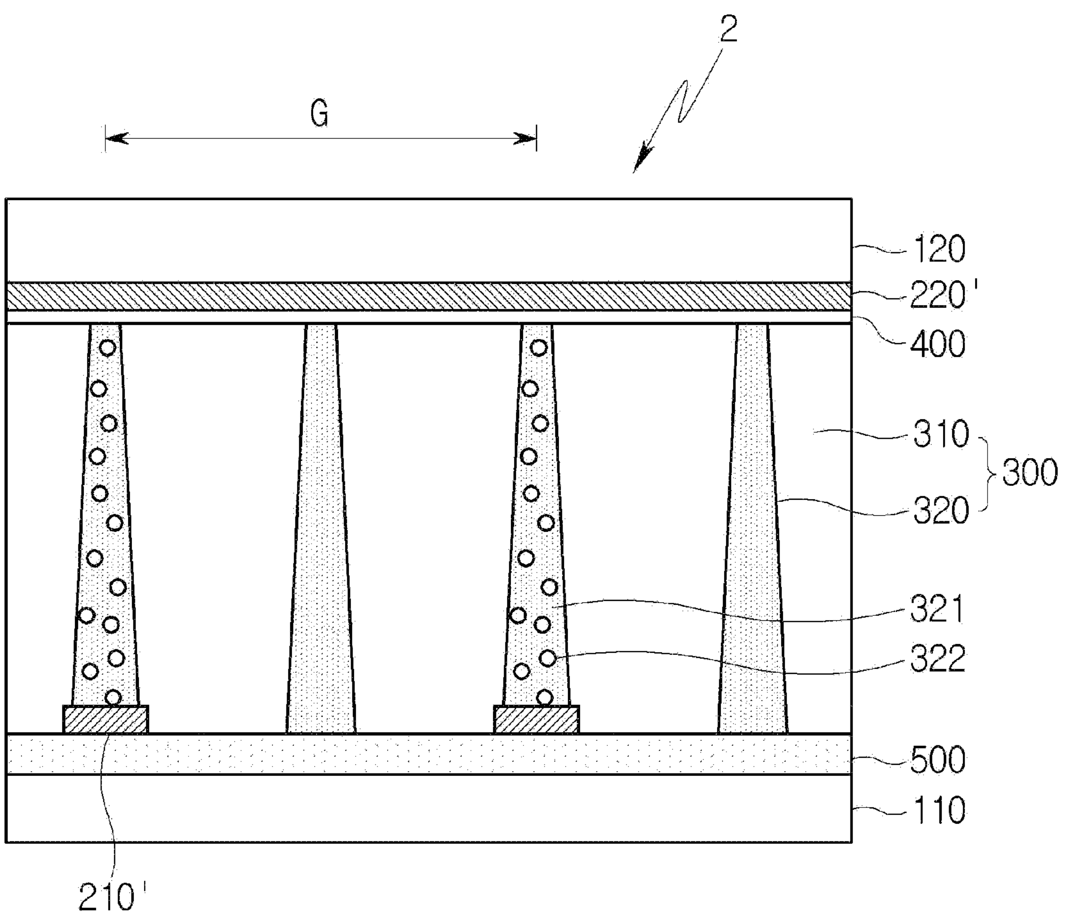
FIG. 8 is a cross-sectional view of a light path control device according to a second embodiment.

As described above, when the first electrode 210 and the second electrode 220 are patterned and the suspended particles 322 move up and down in a zigzag manner in the containing portion 320, an area through which light can pass is increased between the adjacent containing portions 320 as illustrated in FIGS. 6 to 8. Accordingly, since the side aperture ratio of the light conversion layer 300 is improved and the angle of the side viewing angle is also extended, the luminance at the side may be improved in the share mode.

Referring back to FIGS. 2 and 3, an adhesive layer 400 may be further disposed between the light conversion layer 300 and the first substrate 110 and/or the light conversion layer 300 and the second substrate 120. For example, the adhesive layer 400 may be interposed between the light conversion layer 300 and the first electrode 210 and/or between the light conversion layer 300 and the second electrode 220. In FIGS. 2 and 3, an example in which the adhesive layer 400 is disposed between the light conversion layer 300 and the second substrate 120 is illustrated. However, the present embodiment is not limited thereto.

The adhesive layer 400 is formed on the first substrate 110 and the second substrate 120 for coatability and adhesion, and may be, for example, a conductive primer. In such embodiment, the conductive primer may include a curable resin cured by energy such as heat, ultraviolet rays, or electron rays. The curable resin may be, for example, but is not limited to, silicone resin, acrylic resin, methacrylic resin, epoxy resin, melamine resin, polyester resin, or urethane resin, etc.

Further referring to FIGS. 2 and 3, a heating layer 500 may be further disposed between the light conversion layer 300 and the first substrate 110 and/or the light conversion layer 300 and the second substrate 120. In FIGS. 2 and 3, an example in which the heating layer 500 is disposed between the light conversion layer 300 and the first substrate 110 is illustrated. However, the present embodiment is not limited thereto.

The heating layer 500 is a heating element that generates heat energy when electricity is applied, and may be formed of indium tin oxide (ITO), copper (Cu), silver (Ag), or a silver nanowire. The heating layer 500 may include a transparent light transmitting material, and light transmittance of the heating layer 500 may be, for example, greater than or equal to about 70%. The heating layer 500 may generate heat by receiving a voltage through the first electrode 210 and the second electrode 220 or an additionally disposed electrode.

In an embodiment, the heating layer 500 may be electrically connected to the first electrode 210 or the second electrode 220. As illustrated, in a case where the heating layer 500 is disposed between the light conversion layer 300 and the first substrate 110, when a voltage is applied to the first electrode 210, the heating layer 500 may generate heat by receiving the voltage from the first electrode 210. The heat generated in the heating layer 500 is transferred to the light conversion layer 300, and thus increases the activity of the dispersing liquid 321 and the suspended particles 322 in the dispersing liquid 321. When the moving speed of the suspended particles 322 is increased as such, a switching speed between the light-blocking mode and the light-transmitting mode may be improved. In addition, since a temperature of the light conversion layer 300 is properly maintained through the heating layer 500, an influence of the ambient temperature on the light path control device 1 may be reduced, and the operating temperature range of the light path control device 1 can be enhanced.

In the following embodiments, the heating layer 500 as such may be between the first substrate 110 and the first electrode 210 and/or between the second substrate 120 and the second electrode 220. Alternatively, in the following embodiments, the heating layer 500 may be omitted.

FIG. 8 is a cross-sectional view of a light path control device according to a second embodiment. FIG. 9 illustrates various shapes of a first electrode according to the second embodiment. A light path control device 2 according to the second embodiment is substantially the same with the first embodiment except for the shapes of a first electrode 210' and a second electrode 220'. Accordingly, a detailed description of the components other than the first electrode 210' and the second electrode 220' will be omitted below.

Referring to FIG. 8, the light path control device 2 may include a first substrate 110, a second substrate 120, a first electrode 210', a second electrode 220', and a light conversion layer 300.

The first electrode 210' may be disposed on one surface (e.g., an upper surface) of the first substrate 110. The first electrode 210' is interposed between the first substrate 110 and the second substrate 120. In an embodiment, the first electrode 210' is disposed on the upper surface of the first substrate 110 in the form of a pattern electrode having a uniform pattern.

Figure 9A:
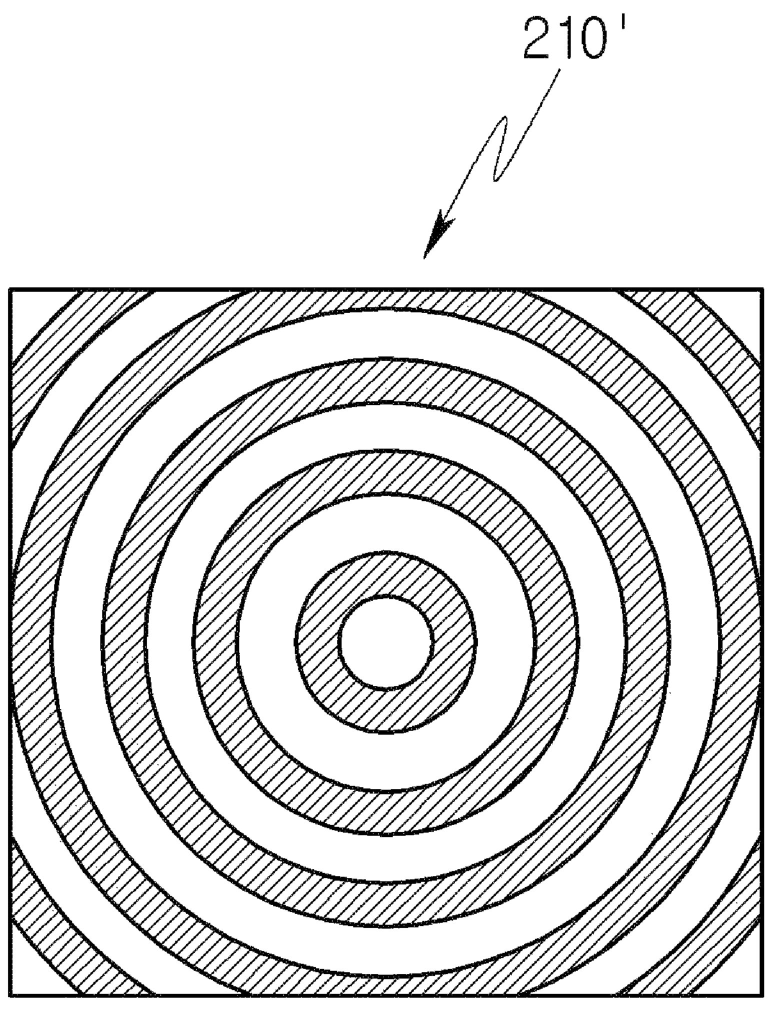
FIGS. 9A, 9B, and 9C illustrates various shapes of a first electrode according to the second embodiment.
Figure 9B:
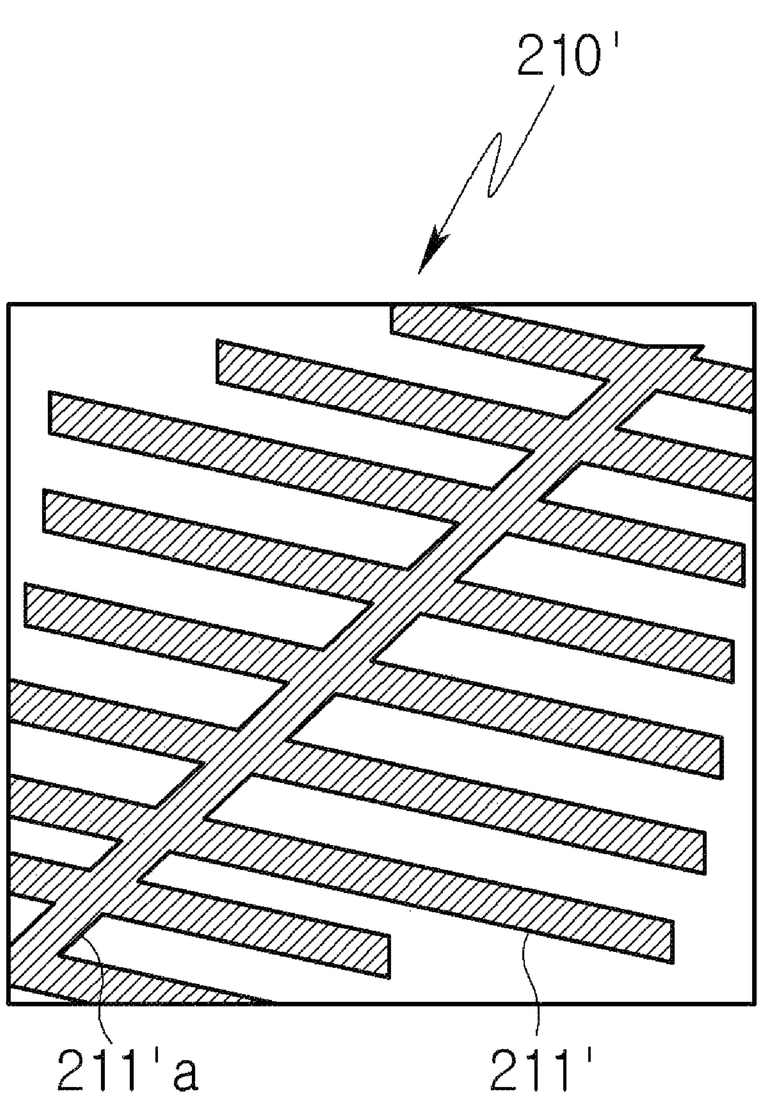
Figure 9C:
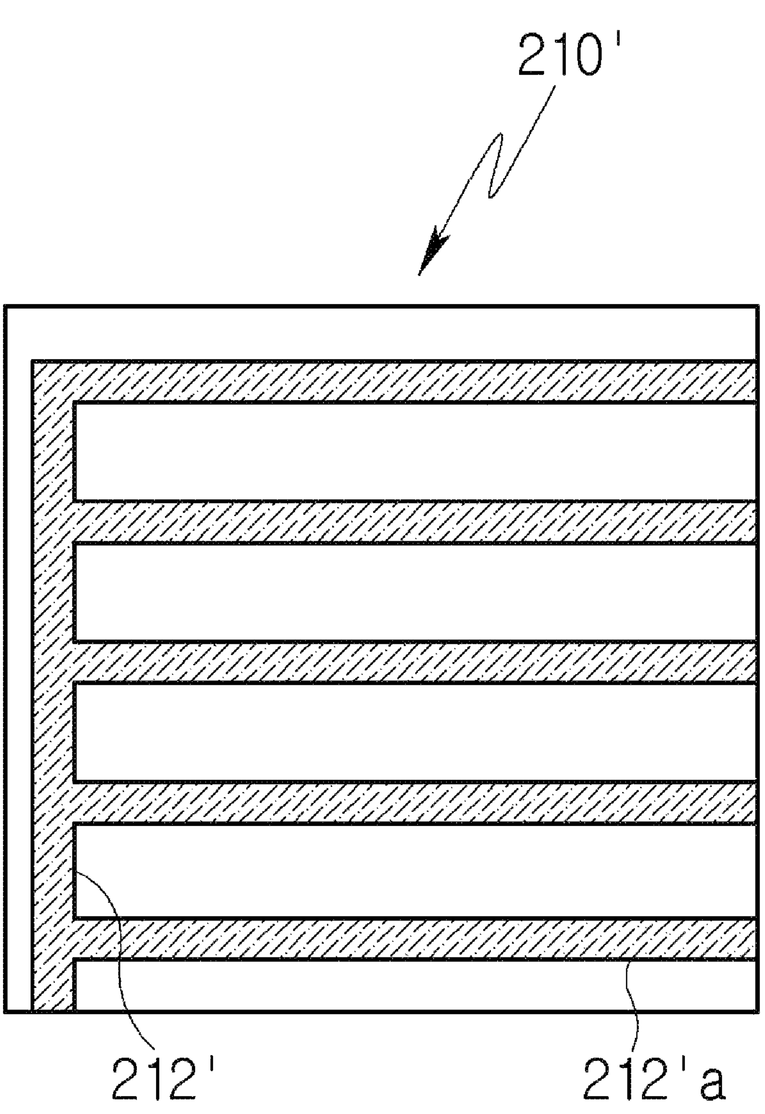

The first electrode 210' may be patterned in a plurality of concentric circles as illustrated in FIG. 9A, or may include a plurality of extension portions 211' and 212' and connecting portions 211'*a* and 212'*a* for connecting the extension portions 211' and 212' as illustrated in FIG. 9B and FIG. 9C. However, the shape of the first electrode 210' is not limited thereto.

The second electrode 220' may be disposed on one surface (e.g., a lower surface) of the second substrate 120. The second electrode 220' is interposed between the first substrate 110 and the second substrate 120. In an embodiment, the second electrode 220' may be disposed on the lower surface of the second substrate 120 in the form of a surface electrode.

The light conversion layer 300 may include a partition wall portion 310 and a containing portion 320. The containing portion 320 may include a dispersing liquid 321 and a suspended particles 322 dispersed in the dispersing liquid 321.

A partial area of the containing portion 320 is disposed to overlap the pattern of the first electrode 210'. That is, the first electrode 210' may include at least one pattern overlapping at least one area of the containing portion 320.

When a voltage is applied to at least one of the first electrode 210' and the second electrode 220', the suspended particles 322 may move by an electric field toward a direction of the first electrode 210' or the second electrode 220'. For example, the suspended particles 322 may be agglomerated around the first electrode 210' as illustrated in FIG. 8, thereby implementing the light-transmitting mode.

Since the first electrode 210' is patterned with a partial area of the containing portion 320, in the area overlapping with the first electrode 210', the suspended particles 322 of the containing portion 320 are agglomerated around the first electrode 210'. In the area that does not overlap with the first electrode 210', the containing portion 320 may be a void in which the suspended particles 322 do not exist.

In such embodiment, a gap G between the agglomerated suspended particles 322 may be controlled according to a pattern of the first electrode 210'. When the shape and pitch of the constituting patterns (e.g., concentric circles illustrated in FIG. 9A or the extension portions 121' and 122' illustrated in FIGS. 9B and 9C are adjusted) of the first electrode 210', the distance G between the suspended particles 322 agglomerated around the first electrode 210' in the light-transmitting mode may be adjusted.

When the distance G between the agglomerated suspended particles 322 in the light-transmitting mode is adjusted as such, an area through which light can pass between the adjacent suspended particles 322 is increased. Accordingly, the side aperture ratio of the light conversion layer 300 is improved and the angle of the side viewing angle is also extended, so that the luminance may be improved. In an embodiment, the aperture ratio of the light path control device 2 may be 50 to 90%, but is not limited thereto.

Figure 10:
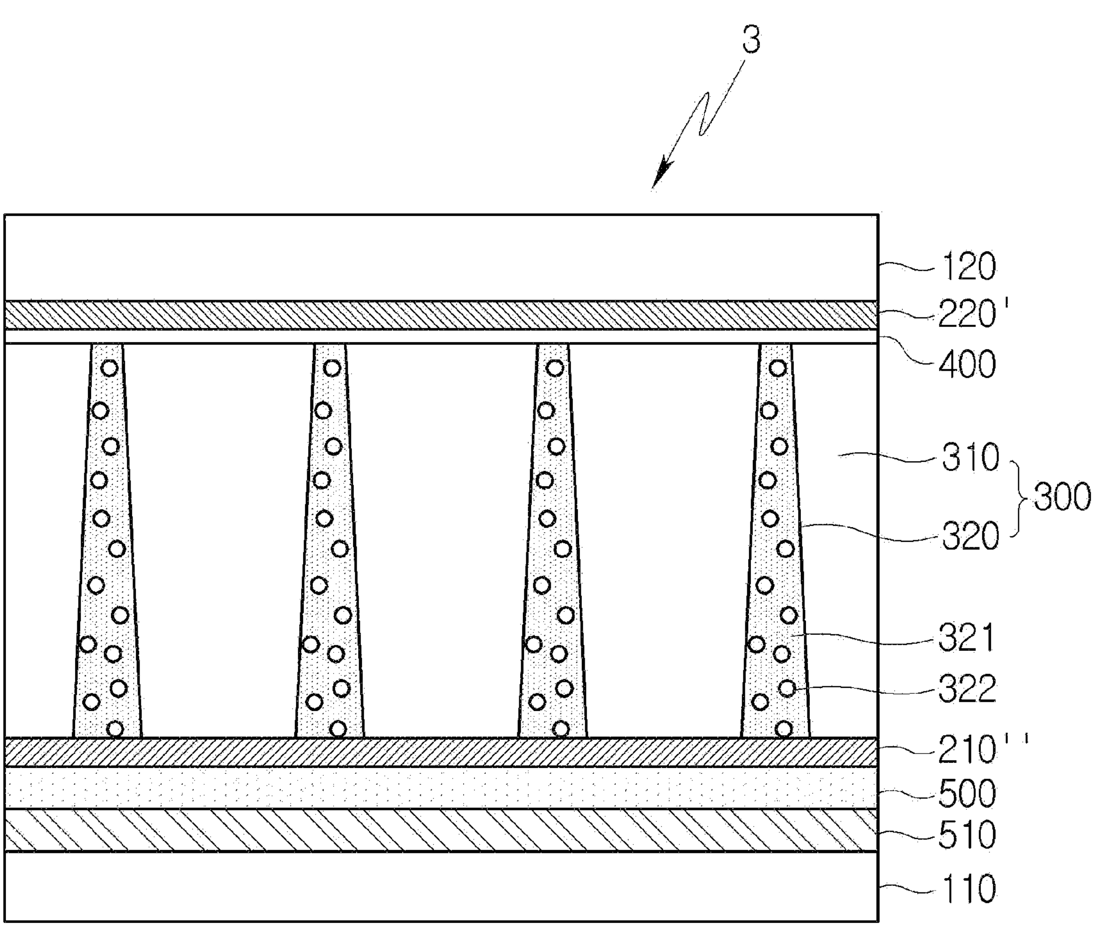
FIGS. 10 and 11 are cross-sectional views of the light path control device according to a third embodiment.
Figure 11:
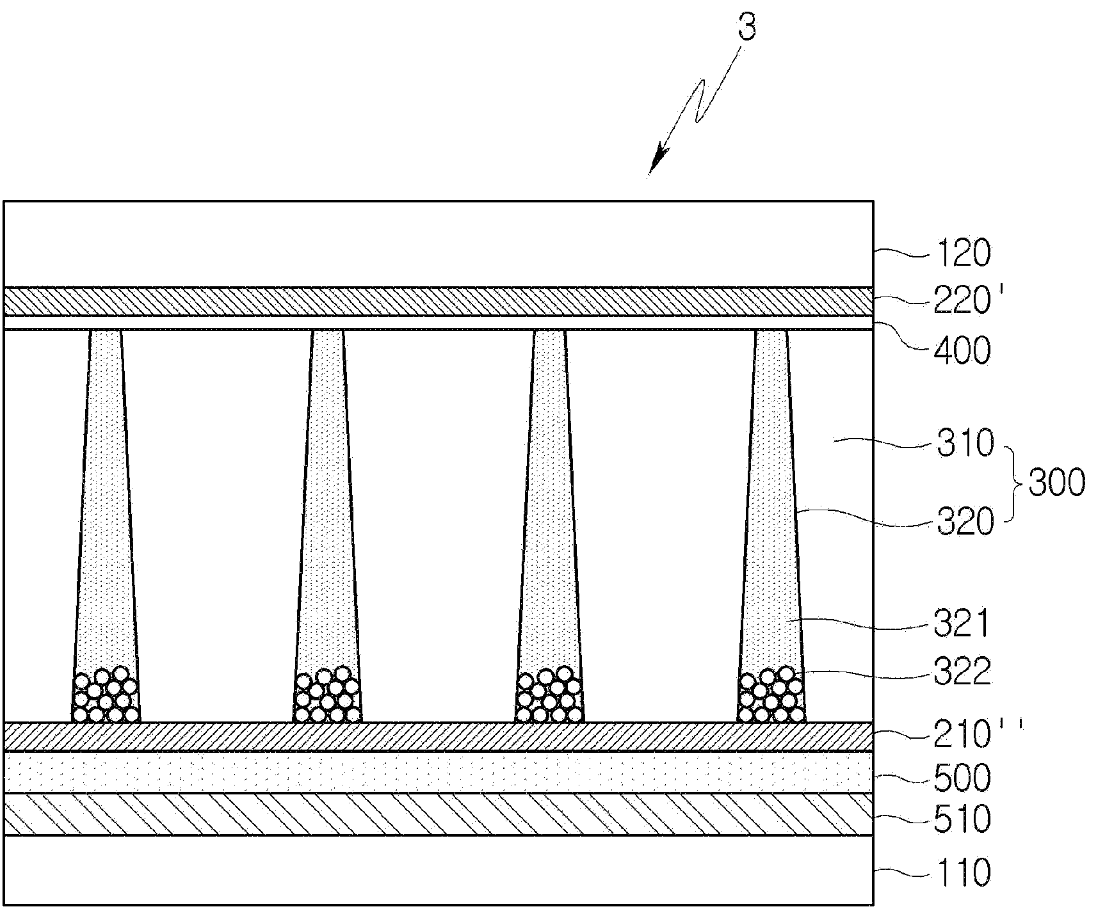
Figure 12:
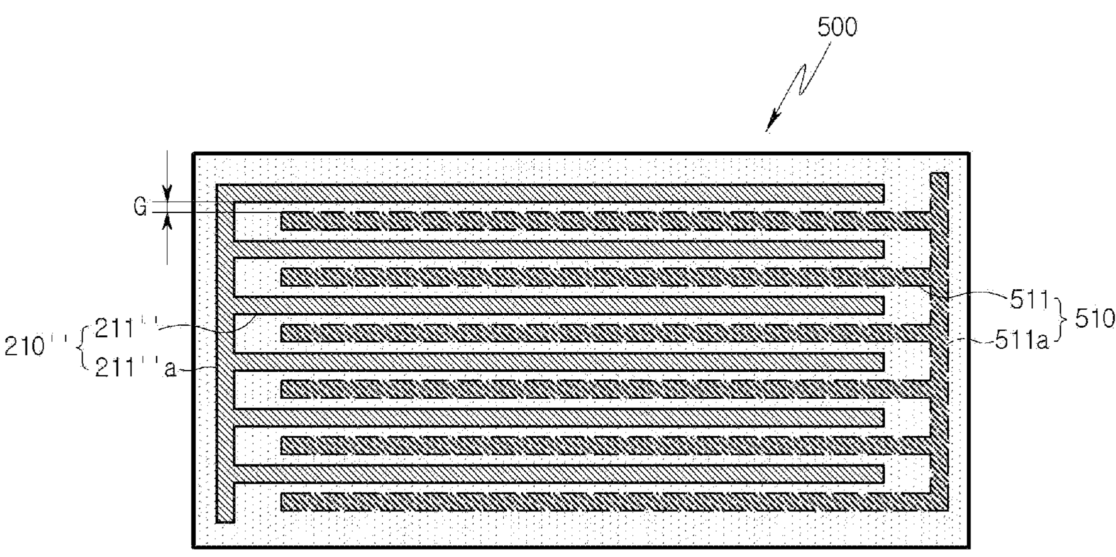
FIG. 12 is a plan view of a light conversion layer according to the third embodiment.

FIGS. 10 and 11 are cross-sectional views of the light path control device according to a third embodiment. FIG. 12 is a plan view of a light conversion layer according to the third embodiment. A light path control device 3 according to the third embodiment is substantially the same with the first and second embodiments except for a first electrode 210" and a heating electrode 510. Accordingly, a detailed description of the components other than the first electrode 210" will be omitted below.

Referring to FIGS. 10 and 11, the light path control device 3 according to the third embodiment may include a first substrate 110, a second substrate 120, a first electrode 210", a second electrode 220', and a light conversion layer 300.

The first electrode 210" may be disposed on one surface (e.g., an upper surface) of the first substrate 110. A first electrode 210" is interposed between the first substrate 110 and the second substrate 120. In one embodiment, the first electrode 210" is disposed on the upper surface of the first substrate 110 in the form of a pattern electrode having a predetermined pattern.

Referring to FIG. 12, the first electrode 210" may include pattern portions 211" that are spaced apart from each other on the first substrate 110 and extend in one direction. The pattern portions 211" may be connected to each other through connecting portion 211"*a*.

A heating layer 500 may be further disposed between the light conversion layer 300 and the first substrate 110. The heating layer 500 is a heating element that generates heat energy when electricity is applied, and may be formed of indium tin oxide (ITO), copper (Cu), silver (Ag), or a silver nanowire.

A heating electrode 510 may be further disposed between the heating layer 500 and the first substrate 110. The heating electrode 510 is provided to transmit an externally applied voltage to the heating layer 500. In an embodiment, the heating electrode 510 may be configured to receive a voltage independently from the first electrode 210" and the second electrode 220', or to receive a voltage dependently on at least one of the first electrode 210" and the second electrode 220'.

The heating electrode 510 may be disposed on one surface (e.g., an upper surface) of the first substrate 110. The heating electrode 510 is disposed on the upper surface of the first substrate 110 in the form of a pattern electrode having a predetermined pattern.

For example, the heating electrode 510 may be formed of pattern portions 511 spaced apart from each other on the first substrate 110 and extending in one direction. The pattern portions 511 may be connected to each other through connecting portions 511*a*.

The first electrode 210" and the heating electrode 510 have the heating layer 500 interposed therebetween and are disposed respectively both surfaces thereof. Here, the pattern portions 211" of the first electrode 210" and pattern portions 511 of the heating electrode 510 are alternately disposed with each other on the first substrate 110 in a plan view. That is, in a plan view, the pattern portion 511 of the heating electrode 510 is disposed between the pattern portions 211" adjacent to the first electrode 210", and the pattern portion 211" of the first electrode 210" may be disposed between adjacent pattern portions 511 of the heating electrode 510.

A gap G between the pattern portion 211" of the first electrode 210" and the pattern portion 511 of the heating electrode 510, which are disposed adjacently, may be appropriately selected to sufficiently ensure the aperture ratio of the light path control device 3.

When the heating electrode 510 is separately provided as in the third embodiment, heat may be stably applied to the light conversion layer 300 irrespective of the structure and mode of the light conversion layer 300. Then, the reliability of the mode switching speed and operation characteristics of the light conversion layer 300 may be further improved. In particular, in this structure, patterning the heating electrode 510 to correspond to the first electrode 210" may ensure the aperture ratio of the light path control device 3 and improve luminance.

Figure 13:
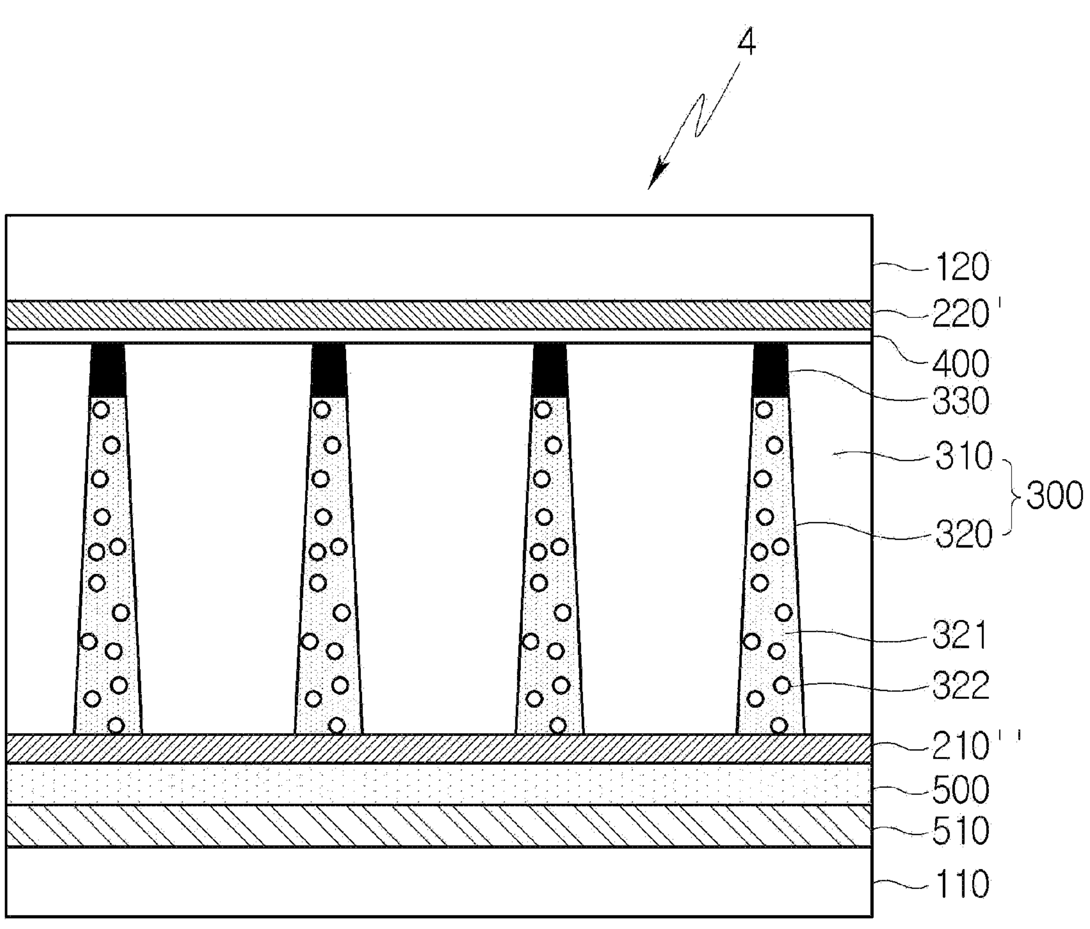
FIGS. 13 and 14 are cross-sectional views of the light path control device according to a fourth embodiment.
Figure 14:
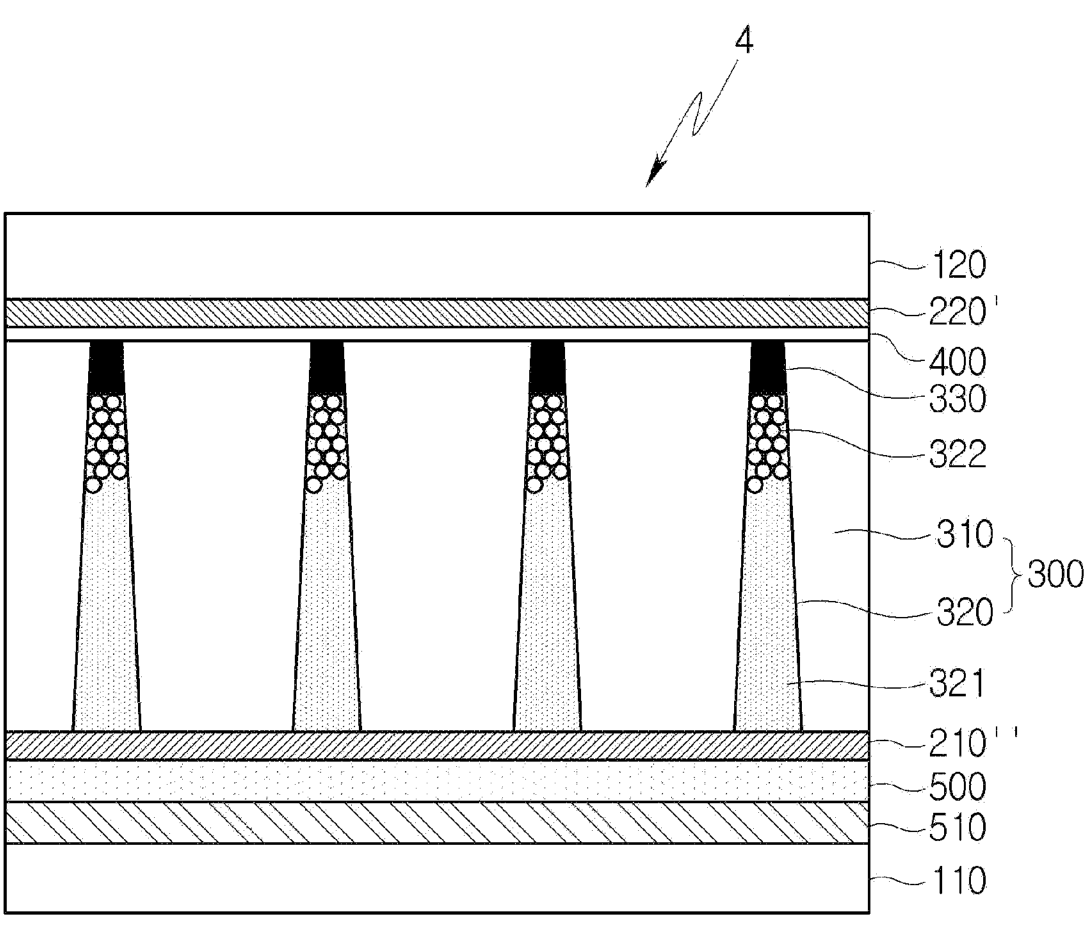

FIGS. 13 and 14 are cross-sectional views of the light path control device according to a fourth embodiment. A light path control device 4 according to the third embodiment is substantially the same with the first to third embodiments except for the structure of the light conversion layer 300. Accordingly, a detailed description of the components other than the structure of the light conversion layer 300 will be omitted below.

Referring to FIGS. 13 and 14, the light path control device 4 may include a first substrate 110, a second substrate 120, a first electrode 210", a second electrode 220', and a light conversion layer 300.

The first electrode 210" may be disposed on one surface (e.g., an upper surface) of the first substrate 110. A first electrode 210" is interposed between the first substrate 110 and the second substrate 120. In one embodiment, the first electrode 210" is disposed on the upper surface of the first substrate 110 in the form of a pattern electrode having a predetermined pattern.

The second electrode 220' may be disposed on one surface (e.g., a lower surface) of the second substrate 120. The second electrode 220' is interposed between the first substrate 110 and the second substrate 120. In an embodiment, the second electrode 220' may be disposed on the lower surface of the second substrate 120 in the form of a surface electrode.

The light conversion layer 300 may include partition wall portion 310 and containing portion 320. The containing portion 320 may include a dispersing liquid 321 and suspended particles 322 dispersed in the dispersing liquid 321.

In the present embodiment, the light conversion layer 300 may further include a light absorbing layer (or the light blocking layer) 330. The light absorbing layer 330 may be disposed at one end of the light conversion layer 300 adjacent to the first electrode 210" or the second electrode 220'. For example, the light absorbing layer 330, in the light-transmitting mode, may be disposed adjacent to an electrode disposed in a direction in which the suspended particles 322 move.

The light absorbing layer 330 may be formed of a material having a lower refractive index than the dispersing liquid 321 including the suspended particles 322. For example, the light absorbing layer 330 may include a hardening material having a low viscosity, and, for example, may be formed by injecting a conductive additive into carbon fibers. Also, the light absorbing layer 330 may be formed by dotting a curing material into the containing portion 320 through inkjet or the like.

As the light conversion layer 300 further includes the light absorbing layer 330, light blocking efficiency may be improved in the light-blocking mode. In addition, when switching to the light-transmitting mode, the moving distance of the suspended particles 322 is shortened, so that a fast mode change becomes possible. In this way, the light path control device 4 may perform more accurately and efficiently the light path control in the light-blocking mode and the light-transmitting mode.

Figure 15:
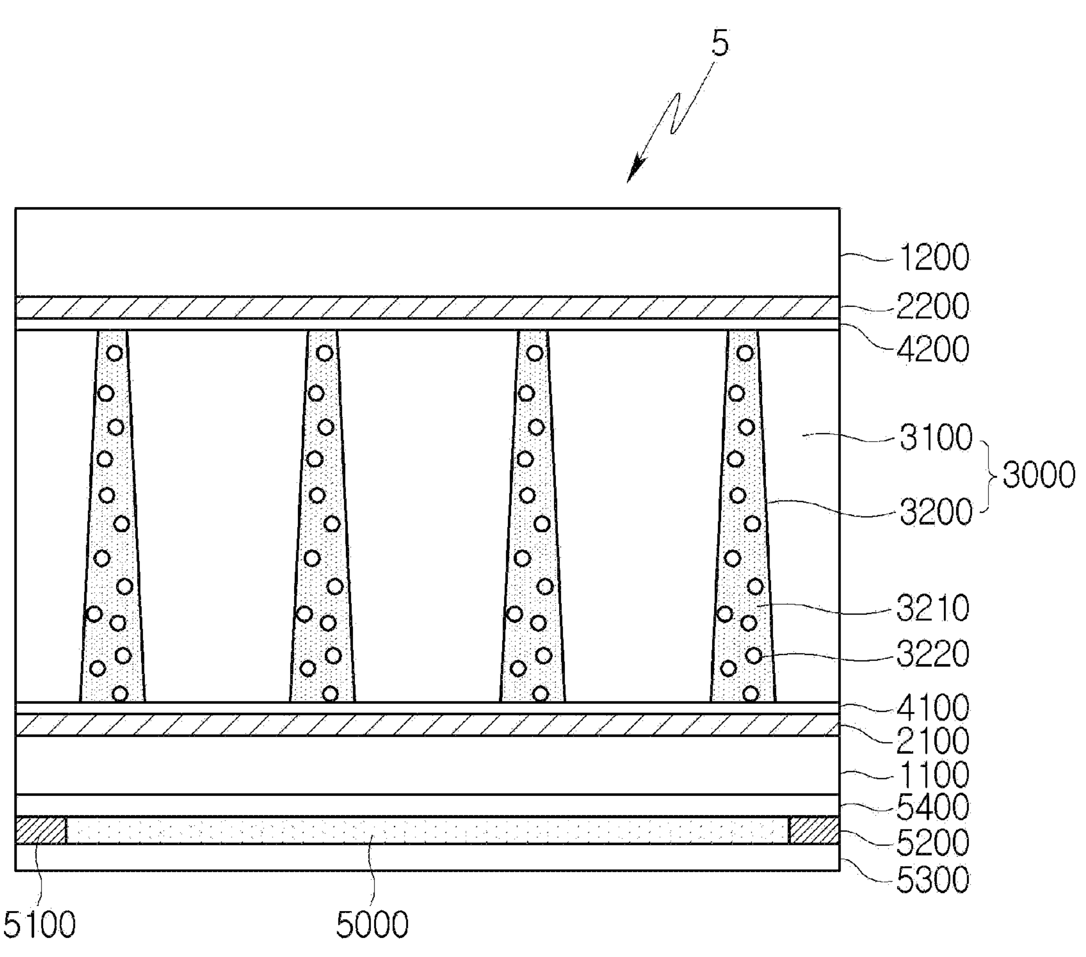
FIGS. 15 and 16 are cross-sectional views of the light path control device according to a fifth embodiment.
Figure 16:
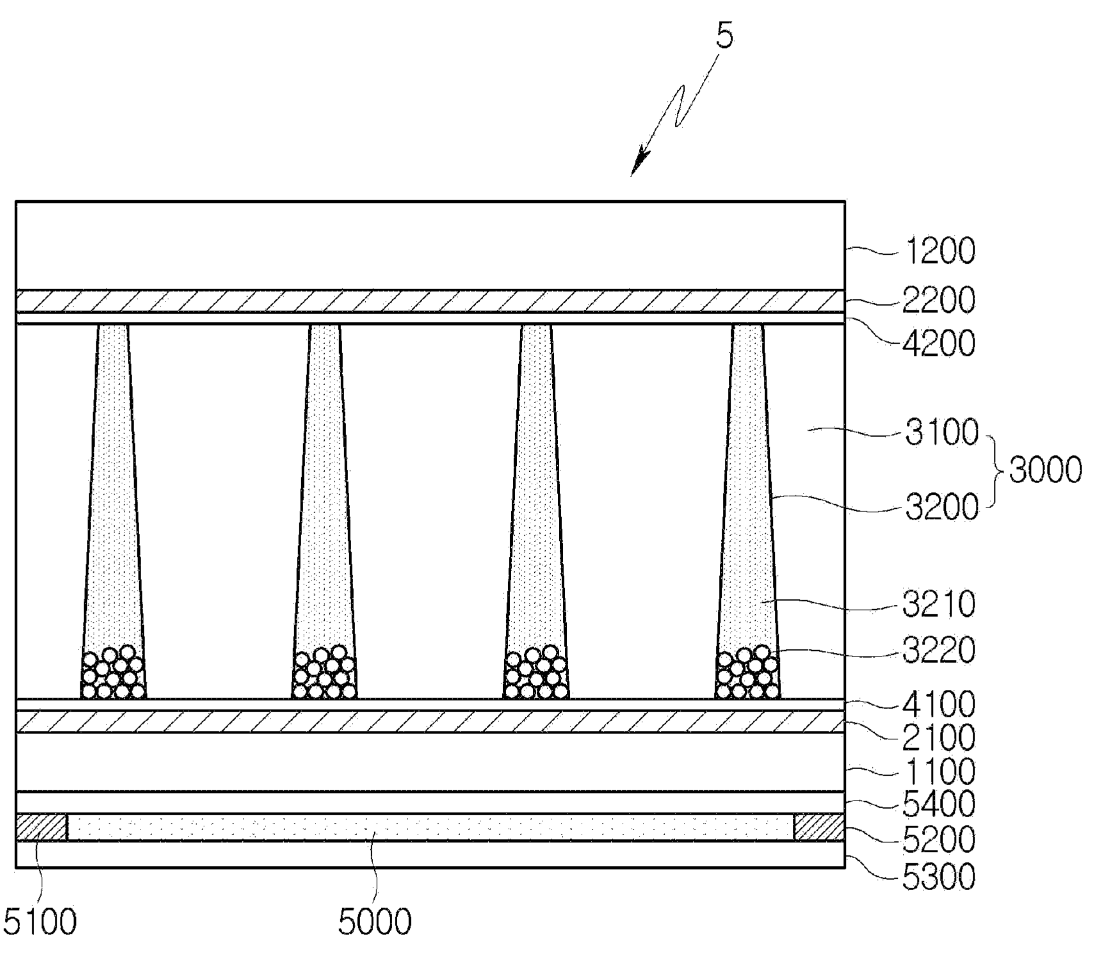

FIGS. 15 and 16 are cross-sectional views of the light path control device according to a fifth embodiment.

Referring to FIGS. 15 and 16, the light path control device 5 according to the fifth embodiment may include a first substrate 1100, a second substrate 1200, a first electrode 2100, a second electrode 2200, and a light conversion layer 3000.

The first substrate 1100 is a base substrate of the light path control device 5, and may be a light-transmissive substrate. The first substrate 1100 may be a rigid substrate including glass or reinforced glass or a flexible substrate of a plastic material. For example, the first substrate 1100 may be a flexible polymer film and may include any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), a triacetylcellulose (TAC) film, a polyvinyl alcohol (PVA) film, polyimide (PI), and polystyrene (PS). However, the material of the first substrate 1100 is not limited thereto.

The first electrode 2100 may be disposed on one surface (e.g., an upper surface) of the first substrate 1100. The first electrode 2100 is interposed between the first substrate 1100 and the second substrate 1200 to be described below. For example, the first electrode 2100 may be disposed on the upper surface of the first substrate 1100 in the form of a surface electrode. However, the present embodiment is not limited thereto, and, in another embodiment, the first electrode 2100 may be disposed on the first substrate 1100 in the form of a pattern electrode having a predetermined pattern.

The first electrode 2100 may include a transparent conductive material. For example, the first electrode 2100 may be formed of indium tin oxide (ITO), indium zinc oxide (IZO), copper oxide, tin oxide, zinc oxide (ZnO), titanium oxide or the like. In an embodiment, a light transmittance of the first electrode 2100 may be greater than or equal to about 80%. Then, the first electrode 2100 is not visibly recognized from the outside and the light transmittance thereof is increased, such that a luminance of the display device including the light path control device 5 may be improved.

In another embodiment, the first electrode 2100 may include various metals for low resistance. For example, the first electrode 2100 may include at least one metal of chromium (Cr), nickel (Ni), copper (Cu), aluminum (Al), silver (Ag), molybdenum (Mo), gold (Au), titanium (Ti), and an alloy thereof.

The second substrate 1200 may be disposed on the first substrate 1100. The second substrate 1200 is a light-transmitting substrate, and may include the same or similar material with the first substrate 1100.

The second electrode 2200 may be disposed on one surface (e.g., a lower surface) of the second substrate 1200. The second electrode 2200 is interposed between the first substrate 1100 and the second substrate 1200. For example, the second electrode 2200 may be disposed on the lower surface of the second substrate 1200 in the form of a surface electrode. However, the present embodiment is not limited thereto, and, in another embodiment, the second electrode 2200 may be disposed on the second substrate 1200 in the form of a pattern electrode having a predetermined pattern.

The second electrode 2200 may include a transparent conductive material, and may include various metals for low resistance. The second electrode 2200 may include the same or similar material as the first electrode 2100.

The light conversion layer 3000 may be interposed between the first substrate 1100 and the second substrate 1200. The light conversion layer 3000 may include a partition wall portion 3100 and a containing portion 3200. Specifically, the light conversion layer 3000 may include a containing portion 3200 partitioned into a plurality of areas by the partition wall portion 3100.

In the light conversion layer 3000, the partition wall portion 3100 and the containing portion 3200 may be alternately disposed with each other in one direction. In this case, the partition wall portion 3100 and the containing portion 3200 may have the same or different widths with respect to the one direction.

The partition wall portion 3100 may include a transparent light-transmitting material. For example, the partition wall portion 3100 may be formed of a UV resin or a photoresist resin as a photo-curable resin, or may be formed of a urethane resin, an acrylic resin, etc. Such partition wall portion 3100 may transmit light incident to the first substrate 1100 or the second substrate 1200 in an opposite direction.

As illustrated, the containing portion 3200 may have one end and the other end of which widths are the same as or different from each other. In the illustrated embodiment, the containing portion 3200 is described in an example where the width of one end adjacent to the first substrate 1100 is wider than the width of the other end adjacent to the second substrate 1200.

The containing portion 3200 may include a dispersing liquid 3210 and suspended particles 3220 dispersed in the dispersing liquid 3210. That is, the dispersing liquid 3210 may be filled in the containing portion 3200, and the suspended particles 3220 may be dispersed in the dispersing liquid 3210.

The dispersing liquid 3210, which is a solvent in which the suspended particles 3220 are dispersed, may be an insulating solvent that is transparent and has a low viscosity. For example, the dispersing liquid 3210 may include at least one of halocarbon-based oil, paraffinic oil, and isopropyl alcohol.

The suspended particles 3220 may be colored electrical behavior particles, for example, black particles. The suspended particles 3220 may be, but are not limited to, carbon black particles. The containing portion 3200 may be electrically connected to the first electrode 2100 and the second electrode 2200, and the charged suspended particles 3220 may be controlled in terms of an arrangement state thereof according to a voltage difference between the first electrode 2100 and the second electrode 2200. According to an arrangement state of the suspended particles 3220, the light conversion layer 3000 may implement the light-transmitting mode and the light-blocking mode.

Specifically, when no voltage is applied to the first electrode 2100 and the second electrode 2200, the suspended particles 3220 are uniformly dispersed in the dispersing liquid 3210 as illustrated in FIG. 15, and thus implement a light-blocking mode that blocks the transmission of external light. Here, since the external light applied to the partition wall portion 3100 may pass through the light conversion layer 3000, the external light may be visibly recognized from the front of the light path control device 5. That is, the light path control device 5 may implement the private mode in which a view is opened for a specific viewing angle (e.g., a front viewing angle) and a view is blocked for another viewing angle (e.g., a side viewing angle).

When a voltage is applied to at least one of the first electrode 2100 and the second electrode 2200, the suspended particles 3220 may move by an electric field toward a direction of the first electrode 2100 or the second electrode 2200, as illustrated in FIG. 16. Here, the moving direction of the suspended particles 3220 may be controlled according to the polarity (negative or positive) of the suspended particles 3220 and a relative magnitude of the voltage applied to the first electrode 2100 and the second electrode 2200.

When the suspended particles 3220 are agglomerated around the first electrode 2100 or the second electrode 2200, external light is pass through the partition wall portion 3100 and the containing portion 3200, through which the light-transmitting mode may be implemented. That is, the light path control device 5 may implement the share mode in which a view is opened for both the front and side.

Adhesive layers 4100 and 4200 each may be further disposed between the light conversion layer 3000 and the first substrate 1100 and/or the light conversion layer 3000 and the second substrate 1200. For example, the adhesive layer 4000 may be interposed between the light conversion layer 3000 and the first electrode 2100 and/or between the light conversion layer 3000 and the second electrode 2200.

The adhesive layers 4100 and 4200 each are formed on the first substrate 1100 and the second substrate 1200 for coatability and adhesion, and may be, for example, a conductive primer. In such embodiment, the conductive primer may include a curable resin cured by energy such as heat, ultraviolet rays, or electron rays. The curable resin may be, for example, but is not limited to, silicone resin, acrylic resin, methacrylic resin, epoxy resin, melamine resin, polyester resin, or urethane resin, etc.

A heating layer 5000 may be further disposed on the other surface of the first substrate 1100. The heating layer 5000 is a heating element that generates heat energy when electricity is applied, and may be formed of indium tin oxide (ITO), copper (Cu), silver (Ag), or a silver nanowire. The heating layer 5000 may include a transparent light transmitting material, and light transmittance of the heating layer 5000 may be, for example, greater than or equal to about 70%.

The heating layer 5000 may generate heat by receiving a voltage through heating electrodes 5100 and 5200 respectively disposed on a first side and a second side thereof. The heating layer 5000 may be electrically connected to the heating electrodes 5100 and 5200. The heating layer 5000 may have insulating films 5300 and 5400 on both sides thereof to prevent the heating electrodes 5100 and 5200 from being short-circuited with surrounding components.

The heat generated in the heating layer 5000 is transferred to the light conversion layer 3000 through the first substrate 1100, and thus increases the activity of the dispersing liquid 3210 and the suspended particles 3220 in the dispersing liquid 3210. When the moving speed of the suspended particles 3220 is increased as such, a switching speed between the light-blocking mode and the light-transmitting mode may be improved. In addition, since a temperature of the light conversion layer 3000 is properly maintained through the heating layer 5000, an influence of the ambient temperature on the light path control device 5 may be reduced, and the operating temperature range of the light path control device 5 can be enhanced.

Figure 17:
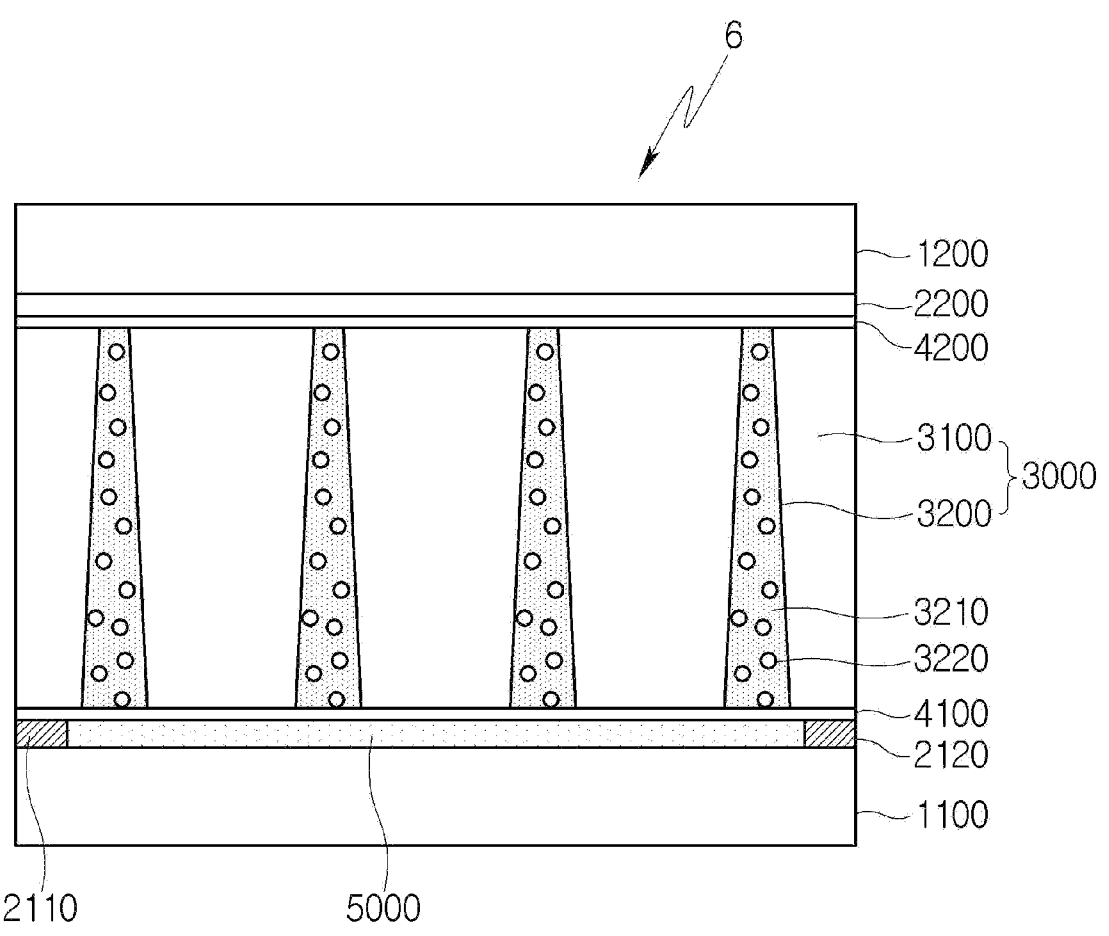
FIGS. 17 and 18 are cross-sectional views of the light path control device according to a sixth embodiment.
Figure 18:
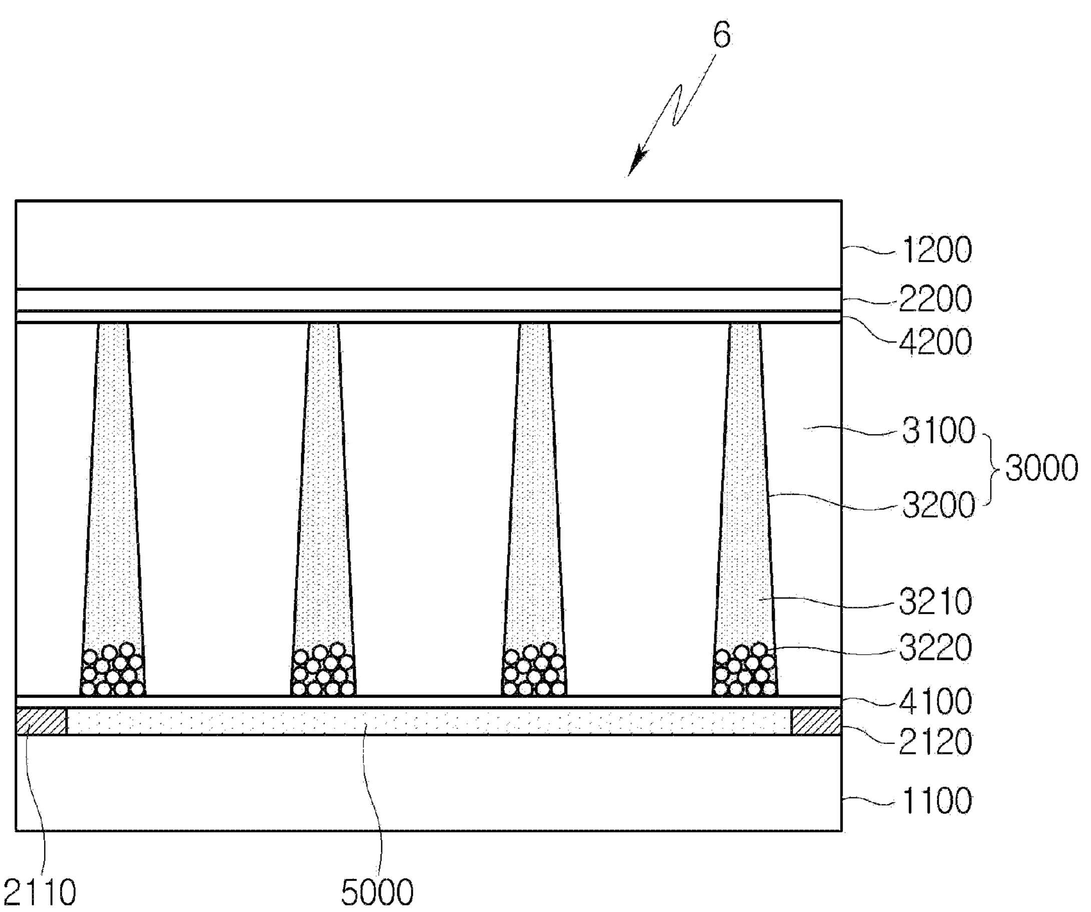

FIGS. 17 and 18 are cross-sectional views of the light path control device according to a sixth embodiment. A light path control device 6 according to the sixth embodiment is substantially the same with the fifth embodiment except that the first electrode 2100 and the heating electrodes 5100 and 5200 are integrally formed. Accordingly, a detailed description of the components other than first electrodes 2110 and 2120 will be omitted below.

Referring to FIGS. 17 and 18, the light path control device 6 may include a first substrate 1100, a second substrate 1200, first electrodes 2110 and 2120, a second electrode 2200, and a light conversion layer 300.

The first electrodes 2110 and 2120 may include a plurality of pattern portions 2110 and 2120. For example, the first pattern portion 2110 may be disposed on a first side of the first substrate 1100, and the second pattern portion 2120 may be disposed on a second side of the first substrate 1100.

A heating layer 5000 may be disposed between the pattern portions 2110 and 2120 of the first electrodes 2110 and 2120. In this embodiment, the heating layer 5000 may generate heat by receiving a voltage through the pattern portions 2110 and 2120 of the first electrodes 2110 and 2120. That is, the pattern portions 2110 and 2120 of the first electrodes 2110 and 2120 serve as a heating electrode.

In the light path control device 6 according to the sixth embodiment, the first electrodes 2110 and 2120 are integrated with a heating electrode, and thus the size of the light path control device 6 and manufacturing cost therefor may be reduced, and production efficiency may be increased by simplifying the manufacturing process.

Figure 19:
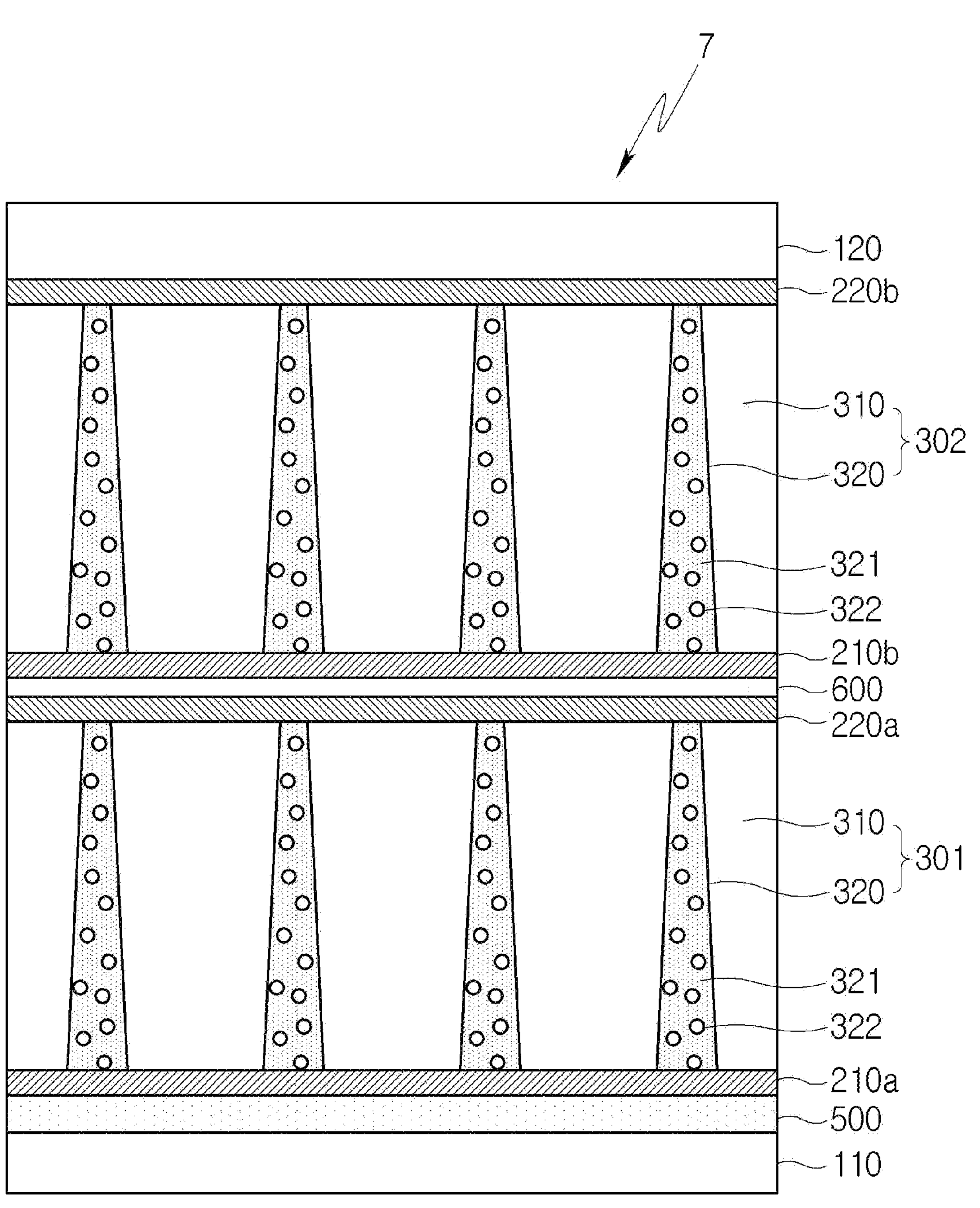
FIG. 19 is a cross-sectional view of a light path control device according to a seventh embodiment.

FIG. 19 is a cross-sectional view of a light path control device according to a seventh embodiment.

A light path control device 7 according to the seventh embodiment is substantially the same with the third embodiment illustrated in FIGS. 10 and 11 except that the light conversion layer 300 is provided as being multi layered. Accordingly, a detailed description of the components other than the light conversion layer 300 will be omitted below.

Referring to FIG. 19, the light path control device 7 may include a first substrate 110, a second substrate 120, and a plurality of light conversion layers 301 and 302 interposed therebetween.

Specifically, a first-1 electrode 210*a*, a first light conversion layer 301, a second-1 electrode 220*a* are stacked on one surface (e.g., an upper surface) of the first substrate 110. A heating layer 500 may be further disposed between the first light conversion layer 301 and the first substrate 110. For example, the heating layer 500 may be disposed between the first electrode 210*a* and the first substrate 110.

The second substrate 120 may be disposed on the first substrate 110. In addition, on one side (e.g., the lower surface) of the second substrate 120, a second-2 electrode 220*b*, a second light conversion layer 302, and a first-2 electrode 210*b* may be stacked.

When a voltage is not applied to the first light conversion layer 301 and the second light conversion layer 302, the first light conversion layer 301 and the second light conversion layer 302 may implement the light-blocking mode. When a voltage is applied to the first light conversion layer 301 and the second light conversion layer 302, the first light conversion layer 301 and the second light conversion layer 302 may implement the light-transmitting mode.

In this case, the electric fields applied to the first light conversion layer 301 and the second light conversion layer 302 may be the same or different in magnitude and direction. For example, the same voltage may be applied to the first-1 electrode 210*a* and the first-2 electrode 210*b*, and the same voltage may be applied to the second-1 electrode 220*a* and the second-2 electrode 220*b*. However, the present embodiment is not limited thereto, and an electric field is applied to only one of the first light conversion layer 301 and the second light conversion layer 302, or electric fields of different magnitudes and/or different directions may be applied to the light conversion layer 301 and the second light conversion layer 302.

An insulating layer 600 is interposed between the first light conversion layer 301 and the second light conversion layer 302, and thus may insulate between the second-1 electrode 210*a* and the second-2 electrode 220*b*.

In such an embodiment, the heating layer 500 may transfer heat to the first light conversion layer 301 and/or the second light conversion layer 302, and thus increase the activity of the suspended particles 322 provided in the first light conversion layer 301 and/or the second light conversion layer 302.

In the illustrated embodiment, the heating layer 500 may transfer heat to the first light conversion layer 301 and/or the second light conversion layer 302, and thus increase the activity of the suspended particles 322 provided therein. For example, heat applied to the heating layer 500 may be indirectly transferred to the second light conversion layer 302 via the insulating layer 600. To this end, the insulating layer 600 may include an insulating material having good thermal conductivity. In another embodiment, a separate heating layer for transferring heat to the second light conversion layer 302 may be provided between the second substrate 120 and the second light conversion layer 302.

As described above, when the light conversion layers 301 and 302 are formed of a plurality of layers, the light conversion layers 301 and 302 may be independently controlled, so that the degree of light blocking may be adjusted and more various modes may be implemented.

Figure 20:
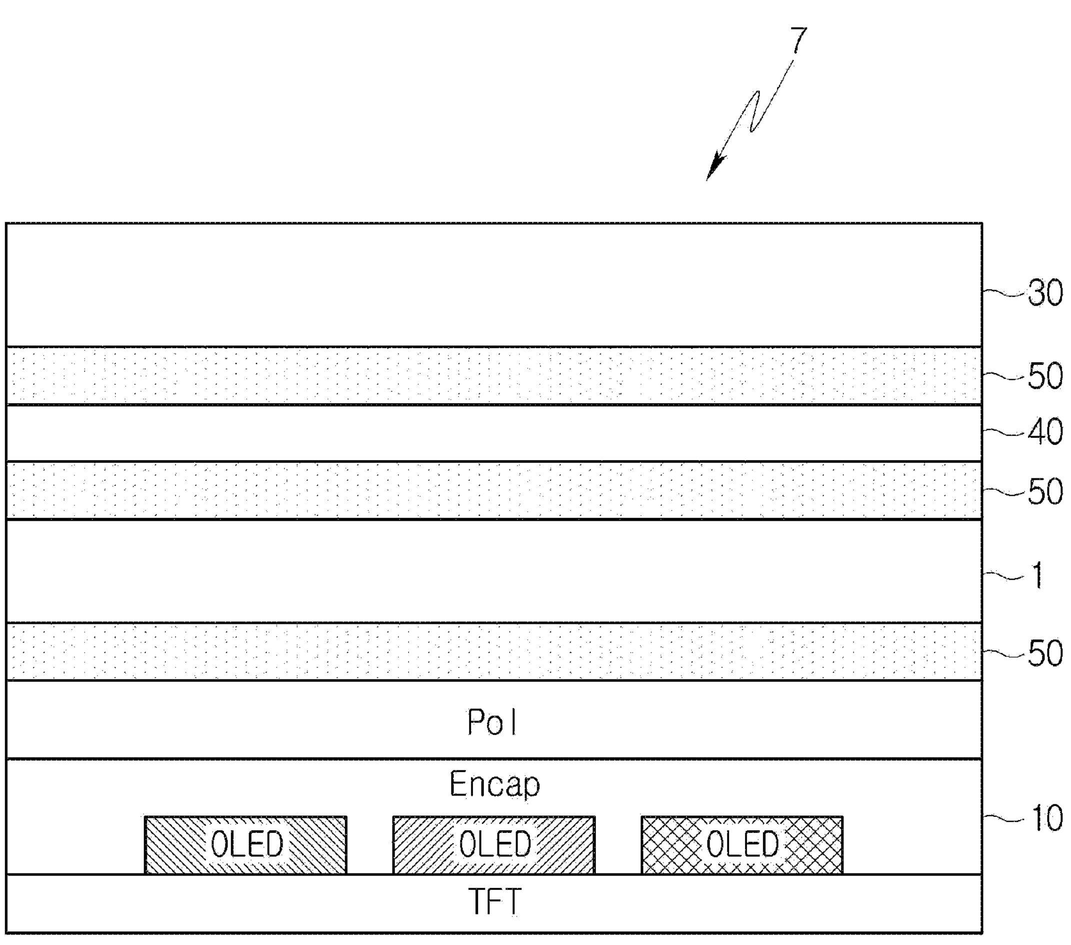
FIG. 20 is a cross-sectional view of a display device according to an embodiment.

FIG. 20 is a cross-sectional view of a display device according to an embodiment.

Referring to FIG. 20, a display device 7 may include a display panel 10, a light path control device 1, and a cover substrate 30.

The display panel 10 may include a plurality of pixels disposed in a display area of a base substrate and driving units disposed in a non-display area around the display area for driving the pixels. The pixels may include transistors TFT connected to the driving units through a control signal line and light emitting elements OLED connected to the transistors. The transistors are turned on or off according to a control signal applied through the control signal line, and therefore adjust the amount of current applied to the light emitting elements. The light emitting element may emit light with a luminance corresponding to the amount of current applied through the transistor. The display panel 10 may further include a protective layer Encap encapsulating the light emitting elements OLED and an upper protective substrate Pol.

The light path control device 1 may be disposed on the display panel 10. In an embodiment, the light path control device 1 may be the light path control device according to the first embodiment described with reference to FIGS. 1 to 7. However, the present embodiment is not limited thereto, and the light path control device 1 may be a light path control device 1 according to any one of the second to sixth embodiments described with reference to FIGS. 8 to 17.

The light path control device 1 may control a light path generated in the display panel 10 according to an operation mode of the display device 7. For example, when the display device 7 operates in the private mode, the light conversion layer 300 of the light path control device 1 is controlled to be the light blocking mode, and therefore may open a view with respect to the front of the display device 7 and block a view with respect to the side. When the display device 7 operates in the share mode, the light conversion layer 300 of the light path control device 1 is controlled to be the light-transmitting mode and therefore may open a view with respect to the front and side of the display device 7.

The cover substrate 30 may be disposed on the light path control device 1. The cover substrate 30 may be provided to protect the display device 7 from external impacts or foreign substances. The cover substrate 30 may be a light-transmitting substrate and be a rigid substrate including glass or reinforced glass or a flexible substrate of a plastic material.

In an embodiment, the display device 7 may further include a touch panel 40. The touch panel 40 may be configured as a capacitive type or a resistive film type and thus may sense a user's touch input.

The display panel 10, the light path control device 1, the touch panel 40, and the cover substrate 30 may be attached to each other through an adhesive layer 50. The adhesive layer 50 may be an optical clear adhesive (OCA) or an optical clear resin (OCR).

Figure 21:
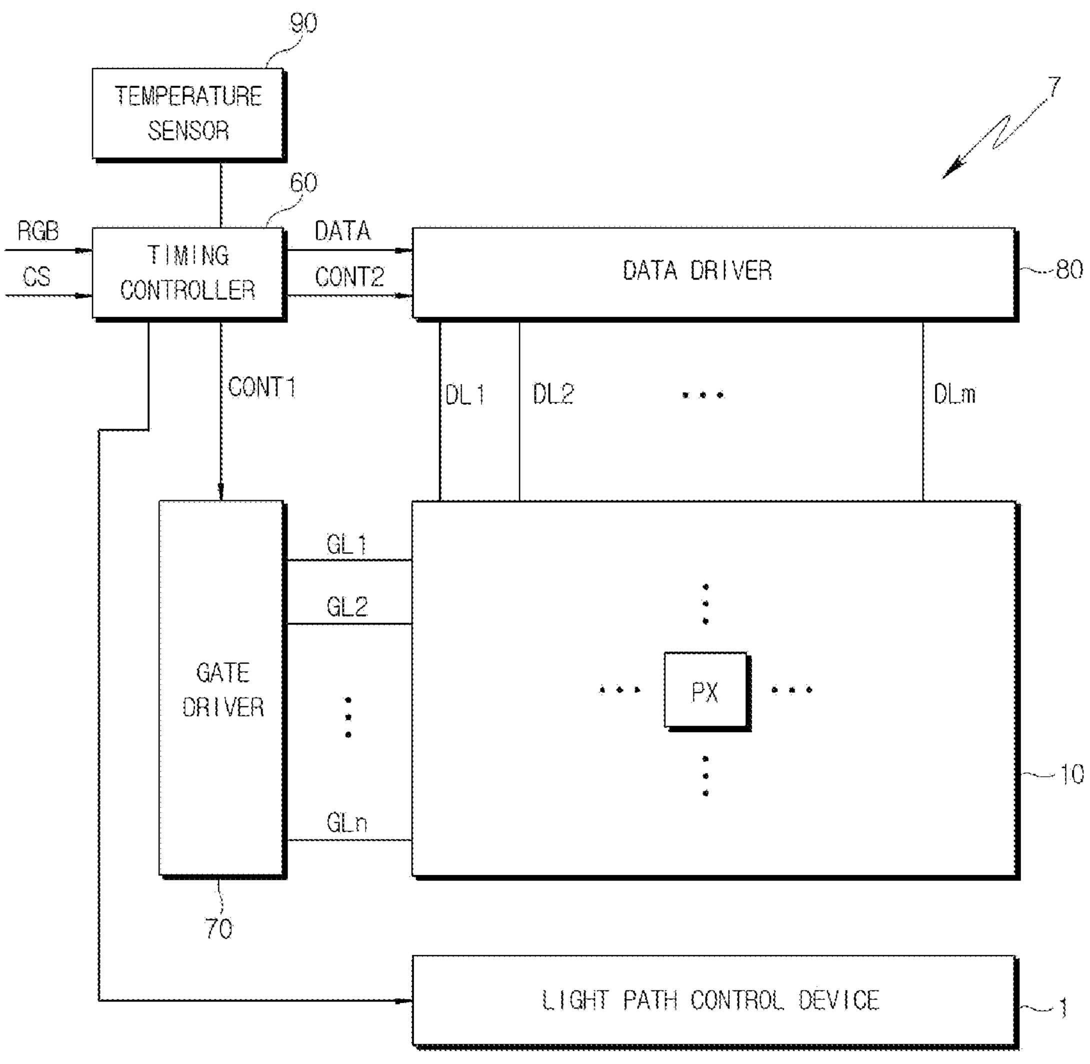
FIG. 21 is a block diagram illustrating a configuration of the display device according to an embodiment.

FIG. 21 is a block diagram illustrating a configuration of a display device according to an embodiment.

Referring to FIG. 21, the display device 7 according to an embodiment includes a display panel 10, a light path control device 1, a controller 60, and a gate driver 70, a data driver 80, and a temperature sensor 90.

A plurality of the pixels PX are disposed on the display panel 10. For example, the pixels PX may be disposed on the display panel 10 in the form of a matrix. The pixels PX may emit light with a luminance which corresponds to the gate signal and the data signal provided through the gate lines GL1 to GLn and the data lines DL1 to DLm. In an embodiment, each pixel PX may represent any one of red, green, blue, and white colors, but the present embodiment is not limited thereto.

The light path control device 1 is disposed on the display panel 10 and may control a light path emitted from the display panel 10. In an embodiment, the light path control device 1 may be the light path control device according to the first embodiment described with reference to FIGS. 1 to 7. However, the present embodiment is not limited thereto, and the light path control device 1 may be a light path control device 1 according to any one of the second to sixth embodiments described with reference to FIGS. 8 to 17.

The controller 60 controls the gate driver 70 and the data driver 80 such that an image is displayed on the display panel 10. For example, the controller 60 may receive an image signal RGB and a control signal CS from the outside. The image signal RGB may include a plurality of grayscale data. The control signal CS may include, for example, a horizontal synchronization signal, a vertical synchronization signal, and a clock signal.

The controller 60 processes the image signal RGB and the control signal to be suitable for the operating conditions of the display panel 10, and thus may generate and output an image data DATA, a gate driving control signal CONT1 and a data driving control signal CONT2.

The gate signals may be generated based on the gate driving control signal CONT1 output from the controller 60. The gate driver 70 may provide the generated gate signals to the pixels PX through the plurality of gate lines GL1 to GLn.

The data driver 80 may generate data signals based on the image data DATA output from the controller 60 and the data driving control signal CONT2. The data driver 80 may provide the generated data signals to the pixels PX through the plurality of data lines DL1 to DLm.

The temperature sensor 90 may measure an ambient temperature of the display device 7, and transmit information about the measured temperature to the controller 60. When the ambient temperature measured by the temperature sensor 90 is higher than a preset threshold, the controller 60 may control the first electrode 210 or a separately provided heating electrode so that electricity is not applied to the heating layer 500 of the light path control device 1. On the contrary, when the ambient temperature measured is less than a preset threshold, the controller 60 may apply a voltage to the first electrode 210 or the heating electrode so that electricity is applied to the heating layer 500 of the light path control device 1. When the heating layer 500 generates heat by the voltage applied to the heating layer 500, the temperature of the light path control device 1 rises appropriately and thus operation efficiency of the light conversion layer 300 may be improved.

The light path control device and the display device including the same according to the embodiments may ensure an aperture ratio and improve luminance in the share mode by patterning an electrode.

In addition, the light path control device and the display device including the same according to the embodiments may reduce the influence of the ambient temperature and improve the operating temperature range.

In addition, the light path control device and the display device including the same according to the embodiments may be efficiently driven, in vehicle navigation and the like, even in winter when the ambient temperature is low. For example, the light control panel and the display device including the same according to the embodiments enable opening of the side viewing angle of the navigation even when the user gets in the vehicle in winter, and consequently allows the driver to view the welcome scene.

The light path control device and the display device including the same according to the embodiments improve a switching speed between the light-blocking mode and the light-transmitting mode and result in better optical profile.

While embodiments of the present disclosure have been described with reference to the attached drawings, it would be understood by those of ordinary skill in the art that the technical configuration of the present disclosure may be implemented in other detailed forms without changing the technical spirit or the essential features of the present disclosure. Thus, it should be noted that the above-described embodiments are provided as examples and should not be interpreted as limiting. Moreover, the scope of the present disclosure should be defined by the following claims rather than the detailed description provided above. Furthermore, the meanings and scope of the claims and all changes or modified forms derived from their equivalents should be construed as falling within the scope of the present disclosure.

What is claimed is:

1. A light path control device comprising:
- a first substrate;
- a first electrode above the first substrate;
- a second substrate on the first substrate;
- a second electrode below the second substrate;
- a heating layer between the first substrate and the first electrode, the heating layer configured to generate a heat energy responsive to a voltage being applied through the first electrode; and
- a light conversion layer between the first electrode and the second electrode, the light conversion layer comprising a partition wall portion and a containing portion alternately disposed with each other,
- wherein the containing portion comprises:
  - a conversion portion comprising a dispersing liquid and suspended particles dispersed in the dispersing liquid, and
- wherein the first electrode comprises:
  - at least one pattern portion that overlaps at least a portion of the containing portion.

2. The light path control device of claim 1, wherein the at least one pattern portion comprises:
- a plurality of first pattern portions spaced apart from each other on the first substrate while extending in one direction; and
- a plurality of second pattern portions spaced apart from each other on the first substrate while extending in the one direction,
- wherein the plurality of first pattern portions and the plurality of second pattern portions are alternately disposed with each other on the first substrate.

3. The light path control device of claim 2, wherein the second electrode comprises:
- a plurality of third pattern portions spaced apart from each other on the second substrate while extending in the one direction, the plurality of third pattern portions facing the plurality of first pattern portions; and
- a plurality of fourth pattern portions spaced apart from each other on the second substrate while extending in the one direction, the plurality of fourth pattern portions facing the plurality of second pattern portions,
- wherein the plurality of third pattern portions and the plurality of fourth pattern portions are alternately disposed with each other on the second substrate.

4. The light path control device of claim 3, wherein the first electrode further comprises:
- a first connecting portion that connects together the plurality of first pattern portions; and
- a second connecting portion that connects together the plurality of second pattern portions,
- and the second electrode further comprises:
  - a third connecting portion that connects together the plurality of third pattern portions; and
  - a fourth connecting portion that connects together the plurality of fourth pattern portions.

5. The light path control device of claim 3, wherein voltages of different levels are applied to the plurality of first pattern portions and the plurality of second pattern portions, and voltages of different levels are applied to the plurality of third pattern portions and the plurality of fourth pattern portions.

6. The light path control device of claim 5, wherein any one of a low potential voltage and a high potential voltage is applied to the plurality of first pattern portions and the plurality of fourth pattern portions, and another one of the low potential voltage and the high potential voltage is applied to the plurality of second pattern portions and the plurality of third pattern portions.

7. The light path control device of claim 1, further comprising:
- an adhesive layer between the first electrode and the light conversion layer, or between the second electrode and the light conversion layer.

* * * * *